United States Patent
Liu et al.

(10) Patent No.: US 12,537,719 B2
(45) Date of Patent: Jan. 27, 2026

(54) PPDU TRANSMISSION METHOD AND RELATED APPARATUS

(71) Applicant: HUAWEI TECHNOLOGIES CO., LTD., GuangDong (CN)

(72) Inventors: Chenchen Liu, Shenzhen (CN); Dandan Liang, Shenzhen (CN); Ming Gan, Shenzhen (CN); Ju Cao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 18/153,482

(22) Filed: Jan. 12, 2023

(65) Prior Publication Data

US 2023/0171129 A1   Jun. 1, 2023

Related U.S. Application Data

(63) Continuation of application No. PCT/CN2021/102242, filed on Jun. 25, 2021.

(30) Foreign Application Priority Data

Jul. 13, 2020 (CN) .......................... 202010671043.8

(51) Int. Cl.
  *H04L 25/02* (2006.01)
  *H04L 5/00* (2006.01)

(52) U.S. Cl.
  CPC ........ *H04L 25/0242* (2013.01); *H04L 5/0007* (2013.01); *H04L 5/0044* (2013.01)

(58) Field of Classification Search
  CPC .......................... H04L 25/0242; H04L 5/0044
  See application file for complete search history.

(56) References Cited

U.S. PATENT DOCUMENTS

2020/0136875 A1* 4/2020 Chen .................... H04B 7/0413
2021/0044389 A1* 2/2021 Kim ..................... H04L 5/0055
(Continued)

FOREIGN PATENT DOCUMENTS

| CN | 102934405 B | 5/2016 |
| CN | 111344981 A | 6/2020 |
| WO | 2019231293 A1 | 12/2019 |

OTHER PUBLICATIONS

IEEE Standards Association, 802.11-2016, IEEE Standard for Information Technology—Telecommunications and information exchange between systems—Local and metropolitan area networks—Specific requirements, "Part 11: Wireless LAN Medium Access Control (MAC) and Physical Layer (PHY) Specifications," IEEE Computer Society—Sponsored by the LAN/MAN Standards Committee, Dec. 7, 2016; 3534 total pages.

(Continued)

*Primary Examiner* — Zhiren Qin
(74) *Attorney, Agent, or Firm* — Rimon PC

(57) ABSTRACT

A physical layer protocol data unit (PPDU) transmission method is provided. The method includes generating a PPDU, where the PPDU includes an extremely high throughput-long training field (EHT-LTF). The EHT-LTF is obtained based on a P matrix and a predefined EHT-LTF sequence. The P matrix is an n×n orthogonal matrix, n is an integer greater than 8, and a first row of the P matrix includes at least one element whose value is 1 and at least one element whose value is −1. The method further includes sending the PPDU. This application may be applied to a wireless local area network (WLAN) system supporting a next-generation wireless fidelity (Wi-Fi) extremely high throughput (EHT) protocol of IEEE 802.11, for example, 802.11 protocols such as 802.11be.

18 Claims, 7 Drawing Sheets

(56) References Cited

U.S. PATENT DOCUMENTS

| | | | |
|---|---|---|---|
| 2021/0135779 A1* | 5/2021 | Gan | H04L 1/0009 |
| 2021/0385830 A1* | 12/2021 | Lim | H04L 5/0023 |
| 2021/0410048 A1* | 12/2021 | Yu | H04J 11/0086 |
| 2022/0255681 A1* | 8/2022 | Huang | H04L 1/1685 |
| 2022/0330344 A1* | 10/2022 | Lou | H04L 5/0055 |

OTHER PUBLICATIONS

Miguel M.López et al., "Orthogonal Cover Code Design for 802.11be Extremely High Throughput WLANs," 2019, 53rd Asilomar Conference on Signals, Mar. 30, 2020 (Mar. 30, 2020); pp. 655-659 (33 total pages).

IEEE Std 802.11ac™-2013, IEEE Standard for Information Technology—Telecommunications and information exchange between systems—Local and metropolitan area networks—Specific requirements, "Part 11: Wireless LAN Medium Access Control (MAC) and Physical Layer (PHY) Specifications," Amendment 4: Enhancements for Very High Throughput for Operation in Bands below 6 GHz, IEEE Computer Society—Sponsored by the LAN/MAN Standards Committee, Dec. 11, 2013; 425 total pages.

IEEE P802.11ax™/D6.0, Draft Standard Information Technology—Telecommunications and information exchange between systems Local and metropolitan area networks—Specific requirements, "Part 11: Wireless LAN Medium Access Control(MAC) and Physical Layer (PHY) Specifications," Amendment 1: Enhancements for High Efficiency WLAN, LAN/MAN Standards Committee of the IEEE Computer Society, Nov. 2019; 780 total pages.

IEEE Std 802.11n™-2009, IEEE Standard for Information Technology—Telecommunications and information exchange between systems—Local and metropolitan area networks—Specific requirements, "Part 11: Wireless LAN Medium Access Control (MAC) and Physical Layer (PHY) specifications," Amendment 5: Enhancements for Higher Throughput, IEEE Computer Society—Sponsored by the LAN/MAN Standards Committee, Oct. 29, 2009; 536 total pages.

IEEE Std 802.11g™-2003, IEEE Standard for Information Technology—Telecommunications and information exchange between systems—Local and metropolitan area networks—Specific requirements, "Part 11: Wireless LAN Medium Access Control (MAC) and Physical Layer (PHY) specifications," Amendment 4: Further Higher Data Rate Extension in the 2.4 GHz Band, IEEE Computer Society, Sponsored by the LAN/MAN Standards Committee, Jun. 27, 2003; 78 total pages.

IEEE Std 802.11b-1999/Cor Jan. 2001, IEEE Standard for Information Technology—Telecommunications and information exchange between systems—Local and metropolitan area networks—Specific requirements, "Part 11: Wireless LAN Medium Access Control (MAC) and Physical Layer (PHY) specifications," Amendment 2: Higher-speed Physical Layer (PHY), extension in the 2.4 GHz band—Corrigendum 1, IEEE Computer Society—Sponsored by the LAN/MAN Standards Committee, Nov. 7, 2001; 24 total pages.

IEEE Std 802.11a-1999, IEEE Standard for Information Technology—Telecommunications and information exchange between systems—Local and metropolitan area networks—Specific requirements, "Part 11: Wireless LAN Medium Access Control (MAC) and Physical Layer (PHY) specifications: High-speed Physical Layer in the 5 GHZ Band," LAN/MAN Standards Committee of the IEEE Computer Society, Sep. 16, 1999; 90 total pages.

IEEE P802.11be ™/D0.01, Draft Standard Information Technology—Telecommunications and information exchange between systems Local and metropolitan area networks—Specific requirements, "Part 11: Wireless LAN Medium Access Control (MAC) and Physical Layer (PHY) Specifications," Amendment 7: Enhancements for extremely high throughput (EHT), LAN/MAN Standards Committee of the IEEE Computer Society, Jul. 2020; 33 total pages.

* cited by examiner

PPDU TRANSMISSION METHOD AND RELATED APPARATUS

CROSS-REFERENCE TO RELATED APPLICATION

This application is a continuation of International Application No. PCT/CN2021/102242, filed on Jun. 25, 2021, which claims priority to Chinese Patent Application No. 202010671043.8, filed on Jul. 13, 2020. The disclosure of the aforementioned applications are hereby incorporated by reference in their entireties.

TECHNICAL FIELD

This application generally relates to the field of wireless local area network (WLAN) technologies, and in particular, to a physical layer protocol data unit (PPDU) transmission method and a related apparatus.

BACKGROUND

The 802.11ac standard has started the use of an orthogonal frequency division multiplexing (OFDM) communication mode. In the 802.11ax standard, a physical layer protocol data unit (PPDU) includes a high efficiency long training field (HE-LTF), and is used by a receive device to perform channel estimation. Conventionally, the 802.11 ax standard can support simultaneous transmission on a maximum of eight spatial streams. To simultaneously perform channel estimation on multiple spatial streams, a quantity of symbols $N_{LTF}$ of an HE-LTF included in a PPDU is greater than or equal to a quantity of spatial streams (e.g., number of spatial stream, $N_{SS}$).

To perform channel estimation on a channel of a data subcarrier including multiple spatial streams, HE-LTFs conventionally need to be orthogonal. To ensure orthogonality between HE-LTFs, a HE-LTF in a PPDU sent on each data subcarrier is an HE-LTF after matrix mapping obtained through multiplying elements of a P matrix by a predefined HE-LTF. The P matrix is an n×n orthogonal matrix, and n is equal to $N_{LTF}$. In a conventional technology, there is only a P matrix whose n is less than or equal to 8.

However, with development of wireless local area network (WLAN) technologies, in a next-generation wireless fidelity (Wi-Fi) standard (for example, 802.11be or Wi-Fi 7), simultaneous data transmission on more spatial streams needs to be supported, to improve data transmission efficiency. For example, a next-generation Wi-Fi standard may support simultaneous data transmission on more than eight spatial streams. In this case, an existing P matrix cannot meet a requirement for performing channel estimation on a channel simultaneously including more than eight spatial streams.

SUMMARY

Embodiments of this application provide a physical layer protocol data unit (PPDU) transmission method and a related apparatus, to meet a requirement for performing channel estimation on a channel with more than eight spatial streams.

According to a first aspect, this application provides a PPDU transmission method, including: generating a PPDU, where the PPDU includes an extremely high throughput-long training field (EHT-LTF), the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1; and sending the PPDU.

According to a second aspect, this application provides a PPDU transmission method, including: receiving a PPDU, where the PPDU includes an EHT-LTF, the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1; and performing channel estimation based on the EHT-LTF of the PPDU.

According to a third aspect, this application provides a PPDU transmission apparatus, and the transmission apparatus may be a PPDU sending apparatus. The transmission apparatus includes: a processing unit (e.g., processing circuit), configured to generate a PPDU, where the PPDU includes an EHT-LTF, the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1; and a sending unit (e.g., a sending circuit), configured to send the PPDU.

According to a fourth aspect, this application provides a PPDU transmission apparatus, and the transmission apparatus may be a PPDU sending apparatus. The transmission apparatus includes: a receiving unit (e.g., a receiving circuit), configured to receive a PPDU, where the PPDU includes an EHT-LTF, the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1; and a processing unit, configured to perform channel estimation based on the EHT-LTF of the PPDU.

An order of the P matrix in the technical solution in this application is greater than 8. When there are more than eight spatial streams, channel estimation can be performed on a channel with multiple spatial streams greater than eight streams, so that the sending apparatus can transmit data on more than eight streams, improving data transmission efficiency. In addition, the first row of the P matrix includes an element whose value is 1 and an element whose value is −1. This can also avoid a spectrum protrusion (e.g., spectral lines) of a pilot subcarrier caused because values of elements in the first row of the P matrix are all 1.

In this application, a value of any element in the P matrix is 1, −1, j, or −j, where j is an imaginary unit. In this way, an element in the P matrix has a value of only 1, −1, j, and −j. The element value is simple, so that a calculation process of multiplying the element in the P matrix by the EHT-LTF sequence is simplified, improving EHT-LTF generation efficiency.

Optionally, when n is 12, a value of any element in the P matrix is 1 or −1. In this way, the element value of the P matrix is simple, which may accelerate calculation of multiplying the P matrix by the EHT-LTF.

In some possible implementations, the predefined EHT-LTF sequence is a sequence specified in the 802.11be standard.

In some possible implementations, the P matrix is obtained through multiplying at least one column of an n-order P1 matrix by −1, and the n-order P1 matrix includes a block matrix that is an (n−1)-order Toeplitz matrix. For example, the P matrix is obtained through multiplying a $(4m+2)^{th}$ column of the n-order P1 matrix by −1, where $0 \leq m \leq (n-2)/4$. Optionally, which column may be included in the at least one column may be agreed on in a protocol.

In this way, a transmission apparatus for PPDU sending and a transmission apparatus for PPDU receiving may store related information of the (n−1)-order Toeplitz matrix according to a rule of the Toeplitz matrix, so that a storage apparatus may obtain partial information of the (n−1)-order Toeplitz matrix based on the related information of the (n−1)-order Toeplitz matrix, and obtain the P matrix, reducing storage load of the storage apparatus.

In some optional implementations, a(x,y)=−a(y,x) in the (n−1)-order Toeplitz matrix, where a(x,y) is an element in an $x^{th}$ row and a $y^{th}$ column in the (n−1)-order Toeplitz matrix, a(y,x) is an element in a $y^{th}$ row and an $x^{th}$ column in the (n−1)-order Toeplitz matrix, and x≠y; or the (n−1)-order Toeplitz matrix is a circulant matrix. In this way, the transmission apparatus for PPDU sending may store only a part of the (n−1)-order Toeplitz matrix, and obtain the P matrix based on the part of the (n−1)-order Toeplitz matrix, effectively reducing storage load of the storage apparatus.

In some possible implementations, n is 12, the (n−1)-order Toeplitz matrix is a circulant matrix, and the first row of the (n−1)-order Toeplitz matrix is one of a vector α=[1, −1, 1, 1, 1, −1, −1, −1, 1, −1, −1], b=[1, 1, −1, 1, −1, −1, 1, −1, −1, −1, 1], a vector obtained after a cyclic shift of α, or a vector obtained after a cyclic shift of b; or the first column of the (n−1)-order Toeplitz matrix is one of a vector $\bar{a}$=[1, −1, −1, 1, −1, −1, −1, 1, 1, 1, −1]$^T$, a vector $\bar{b}$=[−1, 1, −1, −1, 1, −1, 1, 1, 1, −1, −1]$^T$, a vector obtained after a cyclic shift of $\bar{a}$, or a vector obtained after a cyclic shift of $\bar{b}$. In this way, the transmission apparatus for PPDU sending and the transmission apparatus for PPDU receiving may store only a vector of the first row of the 11-order Toeplitz matrix, and construct the P matrix based on the vector of the first row of the 11-order Toeplitz matrix, effectively saving storage space and reducing storage overheads.

For example, n is 12, and the n-order P1 matrix may be:

$$\begin{bmatrix} 1 & 1 & 1 & 1 & 1 & 1 & 1 & 1 & 1 & 1 & 1 & 1 \\ 1 & 1 & -1 & 1 & 1 & 1 & -1 & -1 & -1 & 1 & -1 & -1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \end{bmatrix}, \text{ or}$$

$$\begin{bmatrix} 1 & 1 & 1 & 1 & 1 & 1 & 1 & 1 & 1 & 1 & 1 & 1 \\ 1 & 1 & 1 & -1 & 1 & -1 & -1 & 1 & -1 & -1 & -1 & 1 \\ 1 & 1 & 1 & 1 & -1 & 1 & -1 & -1 & 1 & -1 & -1 & -1 \\ 1 & -1 & 1 & 1 & 1 & -1 & 1 & -1 & -1 & 1 & -1 & -1 \\ 1 & -1 & -1 & 1 & 1 & 1 & -1 & 1 & -1 & -1 & 1 & -1 \\ 1 & -1 & -1 & -1 & 1 & 1 & 1 & -1 & 1 & -1 & -1 & 1 \\ 1 & 1 & -1 & -1 & -1 & 1 & 1 & 1 & -1 & 1 & -1 & -1 \\ 1 & -1 & 1 & -1 & -1 & -1 & 1 & 1 & 1 & -1 & 1 & -1 \\ 1 & -1 & -1 & 1 & -1 & -1 & -1 & 1 & 1 & 1 & -1 & 1 \\ 1 & 1 & -1 & -1 & 1 & -1 & -1 & -1 & 1 & 1 & 1 & -1 \\ 1 & -1 & 1 & -1 & -1 & 1 & -1 & -1 & -1 & 1 & 1 & 1 \\ 1 & 1 & -1 & 1 & -1 & -1 & 1 & -1 & -1 & -1 & 1 & 1 \end{bmatrix}.$$

In some other implementations, n is 12, a(x,y)=−a(y,x) in the (n−1)-order Toeplitz matrix, where a(x,y) is an element in an $x^{th}$ row and a $y^{th}$ column in the (n−1)-order Toeplitz matrix, a(y,x) is an element in a $y^{th}$ row and an $x^{th}$ column in the (n−1)-order Toeplitz matrix, and x≠y. In this way, the transmission apparatus for PPDU sending and the transmission apparatus for PPDU receiving may store only a vector of the first row of the 11-order Toeplitz matrix, and construct the P matrix based on the vector of the first row of the 11-order Toeplitz matrix, effectively saving storage space and reducing storage overheads. For example, the n-order P1 matrix may be:

$$\begin{bmatrix} 1 & 1 & 1 & 1 & 1 & 1 & 1 & 1 & 1 & 1 & 1 & 1 \\ -1 & 1 & -1 & 1 & -1 & -1 & -1 & 1 & 1 & 1 & -1 & 1 \\ -1 & 1 & 1 & -1 & 1 & -1 & -1 & -1 & 1 & 1 & 1 & -1 \\ -1 & -1 & 1 & 1 & -1 & 1 & -1 & -1 & -1 & 1 & 1 & 1 \\ -1 & 1 & -1 & 1 & 1 & -1 & 1 & -1 & -1 & -1 & 1 & 1 \\ -1 & 1 & 1 & -1 & 1 & 1 & -1 & 1 & -1 & -1 & -1 & 1 \\ -1 & 1 & 1 & 1 & -1 & 1 & 1 & -1 & 1 & -1 & -1 & -1 \\ -1 & -1 & 1 & 1 & 1 & -1 & 1 & 1 & -1 & 1 & -1 & -1 \\ -1 & -1 & -1 & 1 & 1 & 1 & -1 & 1 & 1 & -1 & 1 & -1 \\ -1 & -1 & -1 & -1 & 1 & 1 & 1 & -1 & 1 & 1 & -1 & 1 \\ -1 & 1 & -1 & -1 & -1 & 1 & 1 & 1 & -1 & 1 & 1 & -1 \\ -1 & -1 & 1 & -1 & -1 & -1 & 1 & 1 & 1 & -1 & 1 & 1 \end{bmatrix}, \text{ or}$$

$$\begin{bmatrix} 1 & 1 & 1 & 1 & 1 & 1 & 1 & 1 & 1 & 1 & 1 & 1 \\ -1 & 1 & 1 & -1 & 1 & 1 & 1 & -1 & -1 & -1 & 1 & -1 \\ -1 & -1 & 1 & 1 & -1 & 1 & 1 & 1 & -1 & -1 & -1 & 1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & 1 & -1 & 1 & 1 & -1 & 1 & 1 & 1 & -1 \\ -1 & -1 & -1 & -1 & 1 & -1 & 1 & 1 & -1 & 1 & 1 & 1 \\ -1 & 1 & -1 & -1 & -1 & 1 & -1 & 1 & 1 & -1 & 1 & 1 \\ -1 & 1 & 1 & -1 & -1 & -1 & 1 & -1 & 1 & 1 & -1 & 1 \\ -1 & 1 & 1 & 1 & -1 & -1 & -1 & 1 & -1 & 1 & 1 & -1 \\ -1 & -1 & 1 & 1 & 1 & -1 & -1 & -1 & 1 & -1 & 1 & 1 \\ -1 & 1 & -1 & 1 & 1 & 1 & -1 & -1 & -1 & 1 & -1 & 1 \end{bmatrix}.$$

In still some other implementations, n is 16, the (n−1)-order Toeplitz matrix is a circulant matrix, and the first row of the (n−1)-order Toeplitz matrix is one of a vector e=[1, 1, 1, −1, 1, 1, −1, −1, 1, −1, 1, −1, −1, −1, −1], f=[1, 1, 1, −1, −1, −1, −1, 1, −1, 1, −1, −1, 1, 1, −1], a vector obtained after a cyclic shift of e, or a vector obtained after a cyclic shift of f; or the first column of the (n−1)-order Toeplitz matrix is one of a vector $\bar{e}$=[1, −1, −1, −1, −1, 1, −1, 1, −1, −1, 1, 1, −1, 1, 1]$^T$, a vector f=[1, −1, 1, 1, −1, −1, 1, −1, 1, −1, −1, −1, −1, 1, 1]$^T$, a vector obtained after a cyclic shift of $\bar{e}$, or a vector obtained after a cyclic shift of $\bar{f}$. In this way, the transmission apparatus for PPDU sending and the transmission apparatus for PPDU receiving may store only a vector of the first row of the 15-order Toeplitz matrix, and construct the P matrix based on the vector of the first row of the 15-order Toeplitz matrix, effectively saving storage space and reducing storage overheads. For example, n is 16, the 15-order Toeplitz matrix is a circulant matrix, and the 16-order P1 matrix is:

$$\begin{bmatrix} 1 & 1 & 1 & 1 & 1 & 1 & 1 & 1 & 1 & 1 & 1 & 1 & 1 & 1 & 1 & 1 \\ 1 & 1 & 1 & 1 & -1 & 1 & 1 & -1 & -1 & 1 & -1 & 1 & -1 & -1 & -1 & -1 \\ 1 & -1 & 1 & 1 & 1 & -1 & 1 & 1 & -1 & -1 & 1 & -1 & 1 & -1 & -1 & -1 \\ 1 & -1 & -1 & 1 & 1 & 1 & -1 & 1 & 1 & -1 & -1 & 1 & -1 & 1 & -1 & -1 \\ 1 & -1 & -1 & -1 & 1 & 1 & 1 & -1 & 1 & 1 & -1 & -1 & 1 & -1 & 1 & -1 \\ 1 & -1 & -1 & -1 & -1 & 1 & 1 & 1 & -1 & 1 & 1 & -1 & -1 & 1 & -1 & 1 \\ 1 & 1 & -1 & -1 & -1 & -1 & 1 & 1 & 1 & -1 & 1 & 1 & -1 & -1 & 1 & -1 \\ 1 & -1 & 1 & -1 & -1 & -1 & -1 & 1 & 1 & 1 & -1 & 1 & 1 & -1 & -1 & 1 \\ 1 & 1 & -1 & 1 & -1 & -1 & -1 & -1 & 1 & 1 & 1 & -1 & 1 & 1 & -1 & -1 \\ 1 & -1 & 1 & -1 & 1 & -1 & -1 & -1 & -1 & 1 & 1 & 1 & -1 & 1 & 1 & -1 \\ 1 & -1 & -1 & 1 & -1 & 1 & -1 & -1 & -1 & -1 & 1 & 1 & 1 & -1 & 1 & 1 \\ 1 & 1 & -1 & -1 & 1 & -1 & 1 & -1 & -1 & -1 & -1 & 1 & 1 & 1 & -1 & 1 \\ 1 & 1 & 1 & -1 & -1 & 1 & -1 & 1 & -1 & -1 & -1 & -1 & 1 & 1 & 1 & -1 \\ 1 & -1 & 1 & 1 & -1 & -1 & 1 & -1 & 1 & -1 & -1 & -1 & -1 & 1 & 1 & 1 \\ 1 & 1 & -1 & 1 & 1 & -1 & -1 & 1 & -1 & 1 & -1 & -1 & -1 & -1 & 1 & 1 \\ 1 & 1 & 1 & -1 & 1 & 1 & -1 & -1 & 1 & -1 & 1 & -1 & -1 & -1 & -1 & 1 \end{bmatrix};$$

or $$\begin{bmatrix} 1 & 1 & 1 & 1 & 1 & 1 & 1 & 1 & 1 & 1 & 1 & 1 & 1 & 1 & 1 & 1 \\ 1 & 1 & 1 & 1 & -1 & -1 & -1 & -1 & 1 & -1 & 1 & -1 & -1 & 1 & 1 & -1 \\ 1 & -1 & 1 & 1 & 1 & -1 & -1 & -1 & -1 & 1 & -1 & 1 & -1 & -1 & 1 & 1 \\ 1 & 1 & -1 & 1 & 1 & 1 & -1 & -1 & -1 & -1 & 1 & -1 & 1 & -1 & -1 & 1 \\ 1 & 1 & 1 & -1 & 1 & 1 & 1 & -1 & -1 & -1 & -1 & 1 & -1 & 1 & -1 & -1 \\ 1 & -1 & 1 & 1 & -1 & 1 & 1 & 1 & -1 & -1 & -1 & -1 & 1 & -1 & 1 & -1 \\ 1 & -1 & -1 & 1 & 1 & -1 & 1 & 1 & 1 & -1 & -1 & -1 & -1 & 1 & -1 & 1 \\ 1 & 1 & -1 & -1 & 1 & 1 & -1 & 1 & 1 & 1 & -1 & -1 & -1 & -1 & 1 & -1 \\ 1 & -1 & 1 & -1 & -1 & 1 & 1 & -1 & 1 & 1 & 1 & -1 & -1 & -1 & -1 & 1 \\ 1 & 1 & -1 & 1 & -1 & -1 & 1 & 1 & -1 & 1 & 1 & 1 & -1 & -1 & -1 & -1 \\ 1 & -1 & 1 & -1 & 1 & -1 & -1 & 1 & 1 & -1 & 1 & 1 & 1 & -1 & -1 & -1 \\ 1 & -1 & -1 & 1 & -1 & 1 & -1 & -1 & 1 & 1 & -1 & 1 & 1 & 1 & -1 & -1 \\ 1 & -1 & -1 & -1 & 1 & -1 & 1 & -1 & -1 & 1 & 1 & -1 & 1 & 1 & 1 & -1 \\ 1 & -1 & -1 & -1 & -1 & 1 & -1 & 1 & -1 & -1 & 1 & 1 & -1 & 1 & 1 & 1 \\ 1 & 1 & -1 & -1 & -1 & -1 & 1 & -1 & 1 & -1 & -1 & 1 & 1 & -1 & 1 & 1 \\ 1 & 1 & 1 & -1 & -1 & -1 & -1 & 1 & -1 & 1 & -1 & -1 & 1 & 1 & -1 & 1 \end{bmatrix}.$$

In some other optional implementations, n is 14, and the (n−1)-order Toeplitz matrix included in the n-order P1 matrix is a circulant matrix, or the (n−1)-order Toeplitz matrix is a circulant matrix and a symmetric matrix. In this way, the transmission apparatus for PPDU sending and the transmission apparatus for PPDU receiving may store only a vector of the first row of the 13-order Toeplitz matrix, and construct the P matrix based on the vector of the first row of the 13-order Toeplitz matrix, effectively saving storage space and reducing storage overheads. For example, the 14-order P1 matrix may be:

$$\begin{bmatrix} 1 & 1 & 1 & 1 & 1 & 1 & 1 & 1 & 1 & 1 & 1 & 1 & 1 & 1 \\ 1 & -1 & -j & j & -j & -j & j & j & j & j & -j & -j & j & -j \\ 1 & -j & -1 & -j & j & -j & -j & j & j & j & j & -j & -j & j \\ 1 & j & -j & -1 & -j & j & -j & -j & j & j & j & j & -j & -j \\ 1 & -j & j & -j & -1 & -j & j & -j & -j & j & j & j & j & -j \\ 1 & -j & -j & j & -j & -1 & -j & j & -j & -j & j & j & j & j \\ 1 & j & -j & -j & j & -j & -1 & -j & j & -j & -j & j & j & j \\ 1 & j & j & -j & -j & j & -j & -1 & -j & j & -j & -j & j & j \\ 1 & j & j & j & -j & -j & j & -j & -1 & -j & j & -j & -j & j \\ 1 & j & j & j & j & -j & -j & j & -j & -1 & -j & j & -j & -j \\ 1 & -j & j & j & j & j & -j & -j & j & -j & -1 & -j & j & -j \\ 1 & -j & -j & j & j & j & j & -j & -j & j & -j & -1 & -j & j \\ 1 & j & -j & -j & j & j & j & j & -j & -j & j & -j & -1 & -j \\ 1 & -j & j & -j & -j & j & j & j & j & -j & -j & j & -j & -1 \end{bmatrix},$$ or $$\begin{bmatrix} 1 & 1 & 1 & 1 & 1 & 1 & 1 & 1 & 1 & 1 & 1 & 1 & 1 & 1 \\ 1 & -1 & j & -j & j & j & -j & -j & -j & -j & j & j & -j & j \\ 1 & j & -1 & j & -j & j & j & -j & -j & -j & -j & j & j & -j \\ 1 & -j & j & -1 & j & -j & j & j & -j & -j & -j & -j & j & j \\ 1 & j & -j & j & -1 & j & -j & j & j & -j & -j & -j & -j & j \\ 1 & j & j & -j & j & -1 & j & -j & j & j & -j & -j & -j & -j \\ 1 & -j & j & j & -j & j & -1 & j & -j & j & j & -j & -j & -j \\ 1 & -j & -j & j & j & -j & j & -1 & j & -j & j & j & -j & -j \\ 1 & -j & -j & -j & j & j & -j & j & -1 & j & -j & j & j & -j \\ 1 & -j & -j & -j & -j & j & j & -j & j & -1 & j & -j & j & j \\ 1 & j & -j & -j & -j & -j & j & j & -j & j & -1 & j & -j & j \\ 1 & j & j & -j & -j & -j & -j & j & j & -j & j & -1 & j & -j \\ 1 & -j & j & j & -j & -j & -j & -j & j & j & -j & j & -1 & j \\ 1 & j & -j & j & j & -j & -j & -j & -j & j & j & -j & j & -1 \end{bmatrix}.$$

In still some other optional implementations, n is 10, and the P matrix is obtained through multiplying at least one column in a P2 matrix by −1. The P2 matrix includes a 9-order block matrix, elements on a diagonal of the 9-order block matrix are all −1, a value of any element in the 9-order block matrix except the elements on the diagonal is j or −j, a quantity of j in each row is equal to a quantity of −j, and a quantity of j in each column is also equal to a quantity of −j. In this way, a transmission apparatus for PPDU sending and a transmission apparatus for PPDU receiving may store only elements on the diagonal and on one diagonal side of the 9-order Toeplitz matrix, and construct the P matrix based on the elements on the diagonal and on the diagonal side of the 9-order Toeplitz matrix, effectively saving storage space and reducing storage overheads. For example, n is 10, and the 10-order P2 matrix may be:

$$\begin{bmatrix} 1 & 1 & 1 & 1 & 1 & 1 & 1 & 1 & 1 & -1 \\ 1 & -1 & -j & -j & -j & -j & j & j & j & j \\ 1 & -j & -1 & j & j & -j & -j & -j & j & j \\ 1 & -j & j & -1 & -j & j & -j & j & -j & j \\ 1 & -j & j & -j & -1 & j & j & -j & j & -j \\ 1 & -j & -j & j & j & -1 & j & j & -j & -j \\ 1 & j & -j & -j & j & j & -1 & -j & -j & j \\ 1 & j & -j & j & -j & j & -j & -1 & j & -j \\ 1 & j & j & -j & j & -j & -j & j & -1 & -j \\ 1 & j & j & j & -j & -j & j & -j & -j & -1 \end{bmatrix}.$$

In some implementations, n is 12, and the P matrix may be $$P_{12 \times 12} = \begin{bmatrix} A_{4 \times 4} & A_{4 \times 4} & B_{4 \times 4} \\ A_{4 \times 4} & C_{4 \times 4} & D_{4 \times 4} \\ E_{4 \times 4} & F_{4 \times 4} & G_{4 \times 4} \end{bmatrix},$$

where $A_{4 \times 4}$, $B_{4 \times 4}$, $C_{4 \times 4}$, $D_{4 \times 4}$, $E_{4 \times 4}$, $F_{4 \times 4}$, and $G_{4 \times 4}$ are block matrices of $P_{12 \times 12}$, and $$A_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In this way, elements in the P matrix used for multiplying the EHT-LTF sequences corresponding to the first four streams when $N_{SS}$ is greater than 8 and n is greater than 8 are partially same as elements in the P matrix used for multiplying the EHT-LTF sequences when $N_{SS}=4$ and n=4. A calculation process of multiplying the P matrix by the EHT-LTF sequence by the transmission apparatus for PPDU sending and the transmission apparatus for PPDU receiving can be simplified.

According to a fifth aspect, an implementation of this application further provides a PPDU transmission apparatus. The transmission apparatus may include a processor and a transceiver, and optionally further includes a memory. When the processor executes a computer program or instructions in the memory, the method according to any one of the implementations of the first aspect or the second aspect is performed. The transmission apparatus may be understood as a sending apparatus, or may be understood as a receiving apparatus. Alternatively, the transmission apparatus may be understood as a transmission apparatus for PPDU sending and a transmission apparatus for PPDU receiving. The sending apparatus or the transmission apparatus for PPDU sending may be a station, or may be an access point. The receiving apparatus or the transmission apparatus for PPDU receiving may be a station, or may be an access point.

According to a sixth aspect, an implementation of this application further provides a computer-readable storage medium. The computer-readable storage medium stores instructions, and the instructions indicate a communication apparatus to perform the method according to any one of the implementations of the first aspect or the second aspect.

According to a seventh aspect, an implementation of this application further provides a computer program product. The computer program product includes a computer program. When the computer program runs on a computer, the computer is enabled to perform the method according to any one of the implementations of the first aspect to the sixth aspect.

According to an eighth aspect, this application further provides a processor, configured to perform the method according to any one of the implementations of the first aspect to the sixth aspect. In a process of performing these methods, a process of sending the information and a process of receiving the information in the methods may be understood as a process of outputting the information by the processor and a process of receiving the input information by the processor. When outputting the information, the processor outputs the information to a transceiver, so that the transceiver transmits the information.

Still further, after the information is output by the processor, other processing may further need to be performed before the information arrives at the transceiver. Similarly, when the processor receives the input information, the transceiver receives the information and inputs the information into the processor. Still further, after the transceiver receives the information, other processing may need to be performed on the information before the information is input into the processor.

In this case, for operations such as transmission, sending, and receiving related to the processor, if there is no particular statement, or if the operations do not contradict an actual function or internal logic of the operations in related descriptions, the operations may be more generally understood as operations such as output, receiving, and input of the processor, instead of operations such as transmission, sending, and receiving directly performed by a radio frequency circuit and an antenna.

In an implementation process, the processor may be a processor configured to perform these methods, or a processor, for example, a general-purpose processor, that executes computer instructions in a memory to perform these methods. The memory may be a non-transitory memory such as a read-only memory (ROM). The memory and the processor may be integrated on a same chip, or may be separately disposed on different chips. A type of the memory and a manner of disposing the memory and the processor are not limited in implementations of the present disclosure.

According to a ninth aspect, this application provides a chip system. The chip system includes a processor and an interface, configured to support a communication transmission device in implementing a function in the method according to any one of the first aspect to the sixth aspect, for example, determining or processing at least one of data and information involved in the foregoing method. In a possible design, the chip system further includes a memory, and the memory is configured to store information and data that are necessary for the foregoing PPDU transmission apparatus. The chip system may include a chip, or may include a chip and another discrete component.

According to a tenth aspect, this application provides a functional entity. The functional entity is configured to implement the method according to any one of the first aspect to the sixth aspect.

DESCRIPTION OF EMBODIMENTS

The following describes technical solutions of this application with reference to accompanying drawings.

An embodiment of this application provides a communication method applied to a wireless communication system. The wireless communication system may be a wireless local area network (WLAN) or a cellular network, and the method may be implemented by a communication device in the wireless communication system or a chip or a processor in the communication device. In the WLAN, the communication device supports communication performed by using an Institute of Electrical and Electronics Engineers (IEEE) 802.11 series protocol, and the IEEE 802.11 series protocol includes: 802.11be, 802.11ax, or 802.11a/b/g/n/ac.

Figure 1:
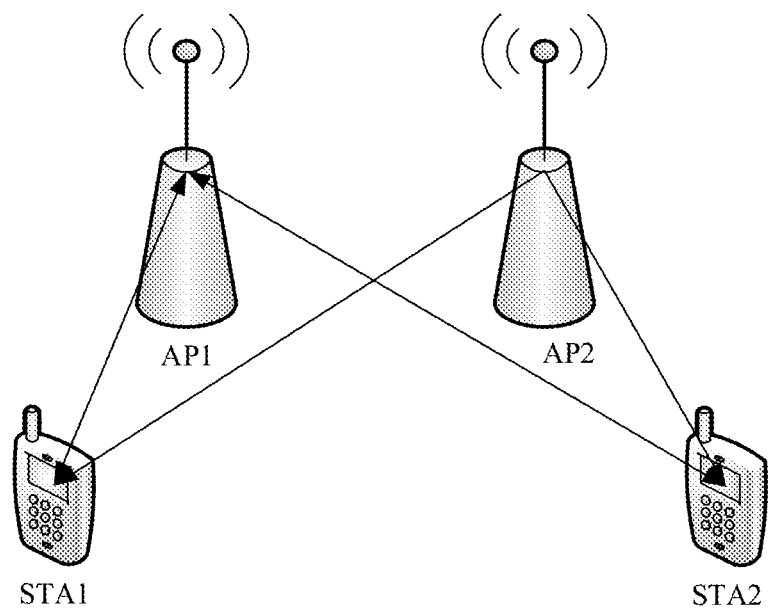
FIG. 1 is a schematic diagram of a network architecture of a communication system according to an embodiment of this application.

For example, in a WLAN, the communication device may be an access point or a station in the WLAN. The WLAN to which the method in embodiments of this application is applicable may include one or more access point (AP) stations and one or more non-access point stations (non-AP STA). For ease of description, an access point station is referred to as an access point (AP), and a non-access point station is referred to as a station (STA) in this specification. For example, FIG. 1 is a schematic diagram of a WLAN. In the example of FIG. 1, the AP is, for example, an AP1 and an AP2 in FIG. 1, and the STA is, for example, a STA1, a STA2, and a STA3 in FIG. 1.

The access point may be an access point used by a terminal device (such as a mobile phone) to access a wired (or wireless) network, and is mainly deployed at home, in a building, and in a park. A typical coverage radius is tens of meters to 100-odd meters. Certainly, the access point may alternatively be deployed outdoors. The access point is equivalent to a bridge connecting a wired network and a wireless network. A main function of the access point is to connect wireless network clients, and then connect the wireless network to the Ethernet. The access point may be a terminal device (such as a mobile phone) or a network device (such as a router) with a wireless fidelity (Wi-Fi) chip.

The access point may be a device that supports the 802.11be standard. Alternatively, the access point may be a device that supports a plurality of WLAN standards of the 802.11 family such as 802.11ax, 802.11ac, 802.11n, 802.11g, 802.11b, and 802.11a. The access point in this application may be a high efficiency (HE) AP or an extremely high throughput (EHT) AP, or may be an access point applicable to a future Wi-Fi standard.

The access point may include a processor and a transceiver. The processor is configured to control and manage an action of the access point, and the transceiver is configured to receive or send information.

The station may be a wireless communication chip, a wireless sensor, a wireless communication terminal, or the like, and may also be referred to as a user. For example, the station may be a mobile phone supporting a Wi-Fi communication function, a tablet computer supporting a Wi-Fi communication function, a set-top box supporting a Wi-Fi communication function, a smart television supporting a Wi-Fi communication function, an intelligent wearable device supporting a Wi-Fi communication function, a vehicle-mounted communication device supporting a Wi-Fi communication function, or a computer supporting a Wi-Fi communication function.

Optionally, the station may support the 802.11be standard. The station may also support a plurality of WLAN standards of the 802.11 family such as 802.11ax, 802.11ac, 802.11n, 802.11g, 802.11b, and 802.11a.

The station may include a processor and a transceiver. The processor is configured to control and manage an action of the access point, and the transceiver is configured to receive or send information.

The access point in this application may be an HE STA or an EHT STA, or may be a STA applicable to a future Wi-Fi standard.

For example, the access point and the station may be devices used in the internet of vehicles, internet of things (IoT) nodes, sensors, or the like in the IoT, smart cameras, smart remote controls, smart water or electricity meters, or the like in smart home, sensors in smart city, and the like.

Although embodiments of this application are mainly described by using a network deployed based on IEEE 802.11 as an example, a person skilled in the art easily understands that various aspects of this application may be extended to other networks using various standards or protocols such as BLUETOOTH, high performance radio local area network (LAN) (HIPERLAN) (a wireless standard that is similar to the IEEE 802.11 standard and that is mainly used in Europe), wide area network (WAN), WLAN, personal area network (PAN), or other networks currently known or later developed. Therefore, the various aspects provided in this application are applicable to any suitable wireless network regardless of coverage and wireless access protocols.

The access point and the station in embodiments of this application may also be collectively referred to as a physical layer protocol data unit (PPDU) transmission apparatus. The PPDU transmission apparatus may include a hardware structure and a software module, and the foregoing functions are implemented in a form of a hardware structure, a software module, or a combination of the hardware structure and the software module. A function in the foregoing functions may be performed in a form of a hardware structure, a software module, or a combination of the hardware structure and the software module.

Figure 2:
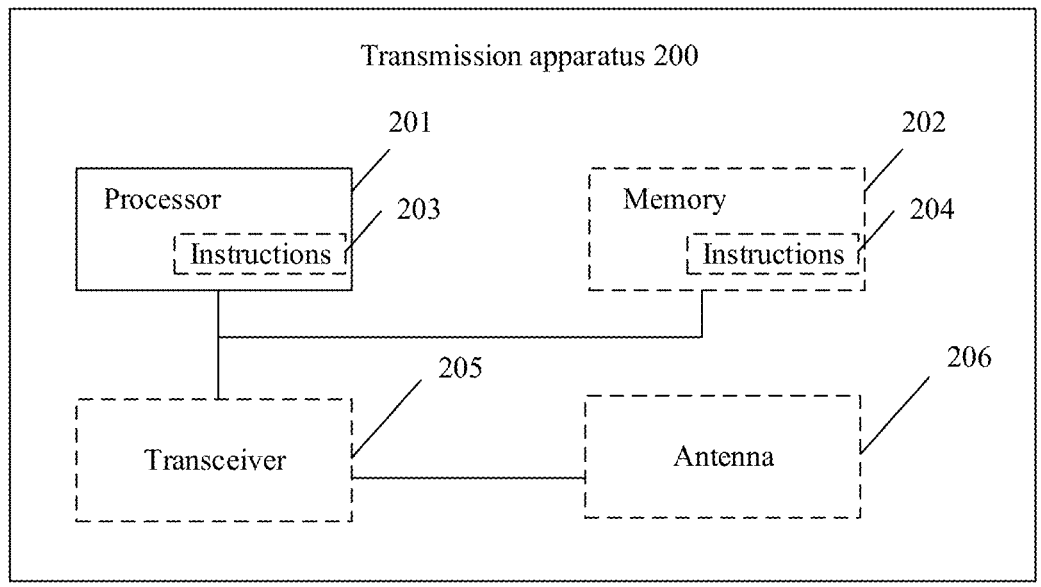
FIG. 2 is a schematic diagram depicting a structure of a physical layer protocol data unit (PPDU) transmission apparatus according to an embodiment of this application.

FIG. 2 is a schematic diagram depicting a structure of a PPDU transmission apparatus according to an embodiment of this application. The transmission apparatus may be used as a PPDU sending apparatus, or may be used as a PPDU receiving apparatus. As shown in FIG. 2, the transmission apparatus 200 may include a processor 201 and a transceiver 205, and optionally further includes a memory 202.

The transceiver 205 may be referred to as a transceiver unit, a transceiver, a transceiver circuit, or the like, and is configured to implement a transceiver function. The transceiver 205 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function.

The memory 202 may store a computer program, software code, or instructions 204, where the computer program, the software code, or the instructions 204 may also be referred to as firmware. The processor 201 may control a medium access control (MAC) layer and a physical (PHY) layer by running a computer program, software code, or instructions 203 in the processor 201, or by invoking the computer program, the software code, or the instructions 204 stored in the memory 202, to implement a data transmission method provided in the following embodiments of this application.

The processor 201 may be a central processing unit (CPU), and the memory 202 may be, for example, a read-only memory (ROM), or a random access memory (RAM).

The processor 201 and the transceiver 205 described in this application may be implemented in an integrated circuit (IC), an analog IC, a radio frequency integrated circuit (RFIC), a mixed-signal IC, an application-specific integrated circuit (ASIC), a printed circuit board (PCB), an electronic device, or the like.

The transmission apparatus 200 may further include an antenna 206. The modules included in the transmission apparatus 200 are merely examples for description, and are not limited in this application.

As described above, the transmission apparatus 200 described in the foregoing embodiment may be an access point or a station. However, the scope of the transmission apparatus described in this application is not limited thereto, and the structure of the transmission apparatus may not be limited to FIG. 2. The transmission apparatus may be an independent device or may be a part of a larger device. For example, an implementation form of the transmission apparatus may be as follows: (1) an independent IC, a chip, a chip system, or a subsystem; (2) a set including one or more ICs, where optionally, the set of ICs may also include a storage component for storing data and instructions; (3) a module that can be embedded in other devices; (4) a receiver, an intelligent terminal, a wireless device, a handheld device, a mobile unit, a vehicle-mounted device, a cloud device, an artificial intelligence device, or the like; or (5) others.

Figure 3:
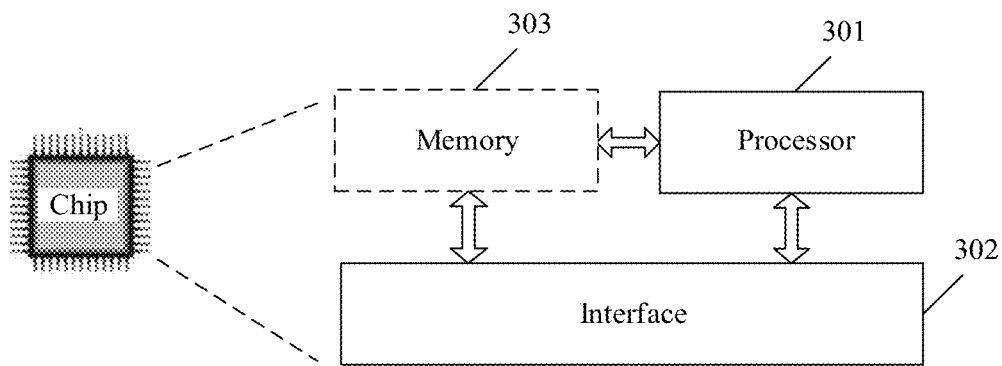
FIG. 3 is a schematic diagram depicting a structure of a chip according to an embodiment of this application.

For the transmission apparatus implemented in the form of a chip or a chip system, refer to a schematic diagram depicting a structure of a chip or a chip system shown in FIG. 3. The chip or the chip system shown in FIG. 3 includes a processor 301 and an interface 302. There may be one or more processors 301, and there may be a plurality of interfaces 302. Optionally, the chip or the chip system may include a memory 303.

Embodiments of this application do not limit the protection scope and applicability of the claims. A person skilled in the art may adaptively change functions and deployments of elements in this application, or omit, replace, or add various processes or components as appropriate without departing from the scope of embodiments of this application.

For a manner of channel estimation of a data subcarrier, in 802.11ax, high efficiency long training fields (HE-LTFs) of multiple symbols are used to estimate a channel of a data subcarrier with multiple spatial streams. A PPDU sent by a PPDU sending apparatus on a channel $H_k$ of a data subcarrier k includes an HE-LTF, where the HE-LTF is obtained through multiplying a P matrix by a predefined HE-LTF sequence (denoted as P×LTF$_k$) and performing inverse Fourier transform. A frequency domain signal $Y_k$ of the HE-LTF received by a PPDU receiving apparatus on the channel $H_k$ of the subcarrier k is $Y_k=H_k P_{4\times 4} LTF_k$. The channel of the $k^{th}$ subcarrier is $H_k=Y_k P_{4\times 4}{}^H/LTF_k$, where $P_{4\times 4}{}^H$ is a transposed conjugate matrix of $P_{4\times 4}$. In this way, the PPDU receiving apparatus can estimate a channel on each subcarrier.

During PPDU construction in 11ax, a relationship between a quantity of spatial streams $N_{SS}$ and a quantity of LTFs $N_{LTF}$ is as follows:

$$N_{LTF} = \begin{cases} N_{SS}, & N_{SS} = 1,2,3,6,8 \\ N_{SS} = 1, & N_{SS} = 3,5,7 \end{cases},$$

That is, when the quantity of spatial streams $N_{SS}$ is 1, the quantity of HE-LTF symbols $N_{LTF}$ in the PPDU is 1; when $N_{SS}$ is 2, $N_{LTF}$ is 2; when $N_{SS}$ is 3 and 4, $N_{LTF}$ is 4; when $N_{SS}$ is 5 and 6, $N_{LTF}$ is 6; and when $N_{SS}$ is 7 and 8, $N_{LTF}$ is 8.

When $N_{SS}$=2 and $N_{LTF}$=2, the P matrix used for multiplying the HE-LTF sequence is:

$$P_{2\times 2} = \begin{bmatrix} 1 & -1 \\ 1 & 1 \end{bmatrix}.$$

When $N_{SS}$=3 or 4, and $N_{LTF}$=4, the P matrix used for multiplying the HE-LTF sequence is:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

When $N_{SS}$=5 or 6, and $N_{LTF}$=6, the P matrix used for multiplying the HE-LTF sequence is:

$$P_{6\times 6} = \begin{bmatrix} 1 & -1 & 1 & 1 & 1 & -1 \\ 1 & -w^1 & w^2 & w^3 & w^4 & -w^5 \\ 1 & -w^2 & w^4 & w^6 & w^8 & -w^{10} \\ 1 & -w^3 & w^6 & w^9 & w^{12} & -w^{15} \\ 1 & -w^4 & w^8 & w^{12} & w^{16} & -w^{20} \\ 1 & -w^5 & w^{10} & w^{15} & w^{20} & -w^{25} \end{bmatrix},$$

where $w=\exp(-j2\pi/6)$.

When $N_{SS}$=7 or 8, and $N_{LTF}$=6, the P matrix used for multiplying the HE-LTF sequence is:

$$P_{8\times 8} = \begin{bmatrix} P_{4\times 4} & P_{4\times 4} \\ P_{4\times 4} & -P_{4\times 4} \end{bmatrix}$$

Figure 4:
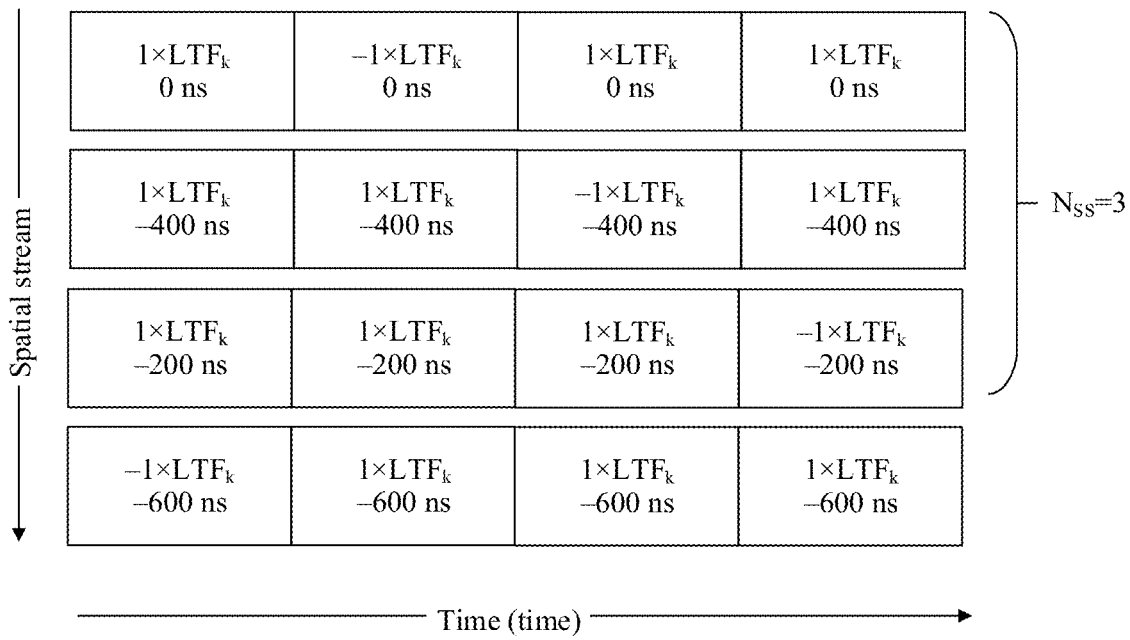
FIG. 4 is a schematic diagram depicting a high efficiency long training field (HE-LTF) structure.

For example, when $N_{SS}$=4 and $N_{LTF}$=4, construction of an HE-LTF transmitted on the $k^{th}$ data subcarrier of the bandwidth is shown in FIG. 4. Each row corresponds to one stream, and HE-LTF$_k$s of four symbols are transmitted on each stream. HE-LTF$_k$ is obtained through multiplying an element in a P matrix by a value corresponding to a $k^{th}$ data subcarrier in an HE-LTF sequence.

LTF$_k$ in FIG. 4 is obtained through multiplying an element in the P matrix by the value corresponding to the $k^{th}$ data subcarrier in the HE-LTF sequence. It should be understood that an HE-LTF of each symbol transmitted on each spatial stream in FIG. 4 is a time domain signal obtained through multiplying an element in the P matrix by the value corresponding to the $k^{th}$ data subcarrier in the HE-LTF sequence and performing inverse Fourier transform.

Cyclic shift diversity (CSD) is set for HE-LTFs transmitted on each spatial stream. As shown in FIG. 4, CSD of a first stream is 0, CSD of a second stream is −400 ns, CSD of a third stream is −200 ns, and CSD of a fourth stream is −600 ns.

For another example, if $N_{SS}$=3, the construction of the HE-LTF transmitted on the $k^{th}$ subcarrier of the bandwidth may include only the first three rows in FIG. 4.

A pilot subcarrier is used for frequency offset estimation. A pilot sequence obtained after R matrix mapping is transmitted on a pilot subcarrier, and the pilot sequence obtained after R matrix mapping is obtained through multiplying the R matrix by a value corresponding to the pilot subcarrier in a predefined HE-LTF sequence. Each row of the R matrix is the first row of the P matrix.

In the 802.11be standard, a quantity of supported spatial streams is greater than 8. A PPDU includes an EHT-LTF. The EHT-LTF corresponds to the HE-LTF in the 802.11ax standard. The EHT-LTF is used for channel estimation. For a manner in which a PPDU receiving apparatus performs channel estimation based on an EHT-LTF, refer to the manner of channel estimation based on an HE-LTF in the foregoing related description of the 802.11ax standard. An order of the P matrix is equal to a quantity of EHT-LTF symbols $N_{LTF}$. The quantity of EHT-LTF symbols $N_{LTF}$ is greater than or equal to the quantity of spatial streams $N_{SS}$. The order of the P matrix is greater than or equal to $N_{SS}$. However, in an existing standard, only an 8×8 P matrix is provided, failing to meet a requirement for performing channel estimation on a channel including more than eight spatial streams.

In a possible embodiment, when n>8, the P matrix is a discrete Fourier transform (DFT) matrix. The P matrix is an N×N DFT W matrix, and an element corresponding to an $m^{th}$ row and an $n^{th}$ column of the W matrix is $$W(m, n) = e^{-j\frac{2\pi}{N}(m-1)(n-1)}.$$

The W matrix may be as follows:

$$W = \begin{bmatrix} 1 & 1 & 1 & 1 & \ldots & 1 \\ 1 & \omega^1 & \omega^2 & \omega^3 & \ldots & \omega^{N-1} \\ 1 & \omega^2 & \omega^4 & \omega^6 & \ldots & \omega^{2(N-1)} \\ 1 & \omega^3 & \omega^6 & \omega^9 & \ldots & \omega^{3(N-1)} \\ \vdots & \vdots & \vdots & \vdots & & \vdots \\ 1 & \omega^{N-1} & \omega^{2(N-1)} & \omega^{3(N-1)} & \ldots & \omega^{(N-1)(N-1)} \end{bmatrix}$$

It can be learned that, if the P matrix is a W matrix, all elements in the first row of the P matrix are 1. In this way, data transmitted on a pilot subcarrier is constant during PPDU transmission, causing a spectrum protrusion (e.g., spectral line) of the pilot subcarrier. In addition, values of most elements in the W matrix are non-integers, and have both a real part and an imaginary part, making calculation of EHT-LTF field generation complex, and increasing calculation complexity of channel estimation.

This application provides some P matrices, to meet a requirement for performing channel estimation on a channel with more than eight spatial streams, resolve a spectrum protrusion (e.g., spectral line) of a pilot subcarrier, reduce calculation complexity, reduce storage load of a PPDU sending apparatus and a PPDU receiving apparatus, and make P matrix generation easier.

The following describes the technical solutions of this application in detail with reference to the PPDU transmission method provided in embodiments of this application.

Figure 5:
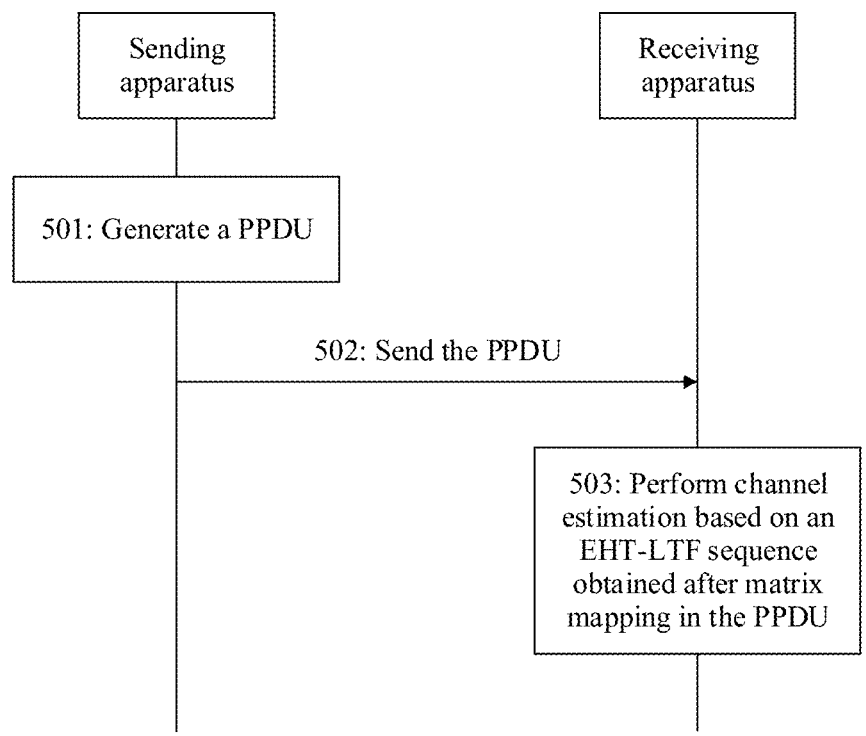
FIG. 5 is a schematic flowchart of a transmission method according to an embodiment of this application.

Refer to a schematic flowchart shown in FIG. 5. The PPDU transmission method in some embodiments includes the following steps.

501: A sending apparatus generates a PPDU, where the PPDU includes an EHT-LTF, and the EHT-LTF is obtained through multiplying an A matrix by a predefined EHT-LTF sequence and performing inverse Fourier transform.

For a data subcarrier, a mapped A matrix is a P matrix. The P matrix is an n×n orthogonal matrix (that is, P×P$^H$=I), and n is greater than 8. For a pilot subcarrier, a mapped A matrix is an R matrix. The R matrix is an n×n matrix obtained through repeating the first row of the P matrix for n times. The first row of the P matrix includes at least one element whose value is 1 and at least one element whose value is −1, so that the R matrix is not all 1 or −1, avoiding a protrusion of a pilot subcarrier for transmitting a signal.

During multi-stream transmission, a PPDU includes EHT-LTFs of multiple OFDM symbols. The quantity of spatial streams $N_{SS}$ is less than or equal to the quantity of EHT-LTF symbols $N_{LTF}$.

It should be understood that, in this application, a process of EHT-LTF generation is not limited to multiplying an A matrix by a predefined EHT-LTF sequence and performing inverse Fourier transform, and may further include another processing process.

Figure 6:
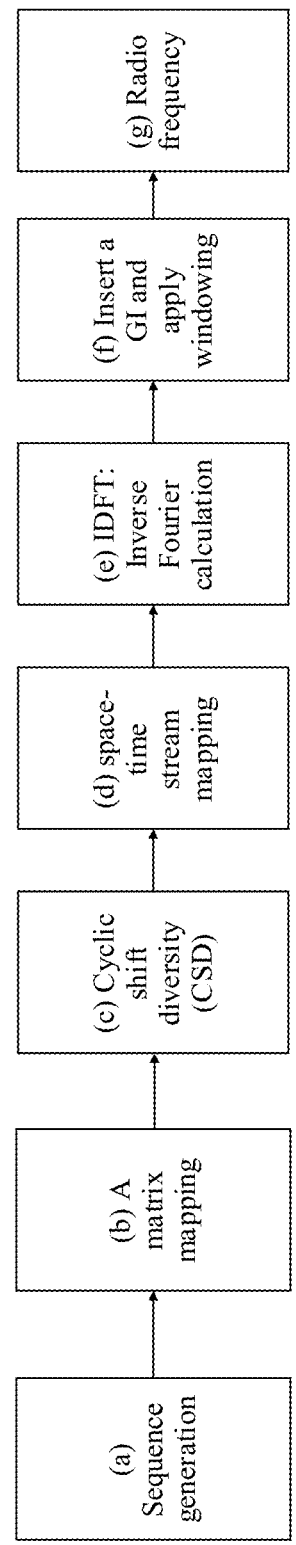
FIG. 6 is a schematic flowchart of extremely high throughput-long training field (EHT-LTF) sequence generation.

FIG. 6 is a schematic flowchart of EHT-LTF sequence generation. A process in which a sending apparatus generates an EHT LTF includes the following steps.

(a) Sequence generation: Generate an EHT-LTF sequence over a frequency domain bandwidth.

The sending apparatus stores a predefined EHT LTF sequence, and the predefined EHT LTF sequence may be agreed on in a protocol, for example, agreed on in the 802.11be protocol. The predefined EHT LTF sequence includes multiple different sequences of different bandwidths and different types. The different bandwidths may include a 20 M bandwidth, a 40 M bandwidth, an 80 M bandwidth, a 160 M bandwidth, a 320 M bandwidth, a 160 M+160 M bandwidth, and the like. The different types include 1×LTF, 2×LTF, 4×LTF, and the like. For example, the multiple different sequences of different bandwidths and different types include: a sequence of a 20 M bandwidth and 1×LTF, a sequence of a 20 M bandwidth and 2×LTF, a sequence of a 20 M bandwidth and 4×LTF, a sequence of a 40 M bandwidth and 1×LTF, a sequence of a 40 M bandwidth and 2×LTF, a sequence of a 40 M bandwidth and 4×LTF, . . . , a sequence of a 320 M bandwidth and 4×LTF, and the like.

The sending apparatus generates, based on a bandwidth for transmitting the PPDU, an EHT-LTF sequence corresponding to the bandwidth and the type.

(b) A matrix mapping: Apply a P matrix to a data subcarrier of the EHT-LTF sequence, and apply an R matrix to a pilot subcarrier of the EHT-LTF. The R matrix includes x duplicates of the first row of the P matrix, where x is a quantity of spatial streams. In other words, elements in each row of the R matrix are elements in the first row of the P matrix.

The A matrix mapped to the $k^{th}$ subcarrier is $$\begin{cases} R, \text{ the } k^{th} \text{ subcarrier is a pilot subcarrier} \\ P, \text{ other cases} \end{cases}.$$

A mapping process of A matrix mapping is as follows: When the $k^{th}$ subcarrier is a pilot subcarrier, the A matrix is an R matrix, and the R matrix is multiplied by a sequence value of the $k^{th}$ subcarrier in the pilot sequence; or when the $k^{th}$ subcarrier is a data subcarrier, the A matrix is a P matrix, and the P matrix is multiplied by a sequence value of the $k^{th}$ subcarrier in the EHT-LTF sequence.

Figure 7:
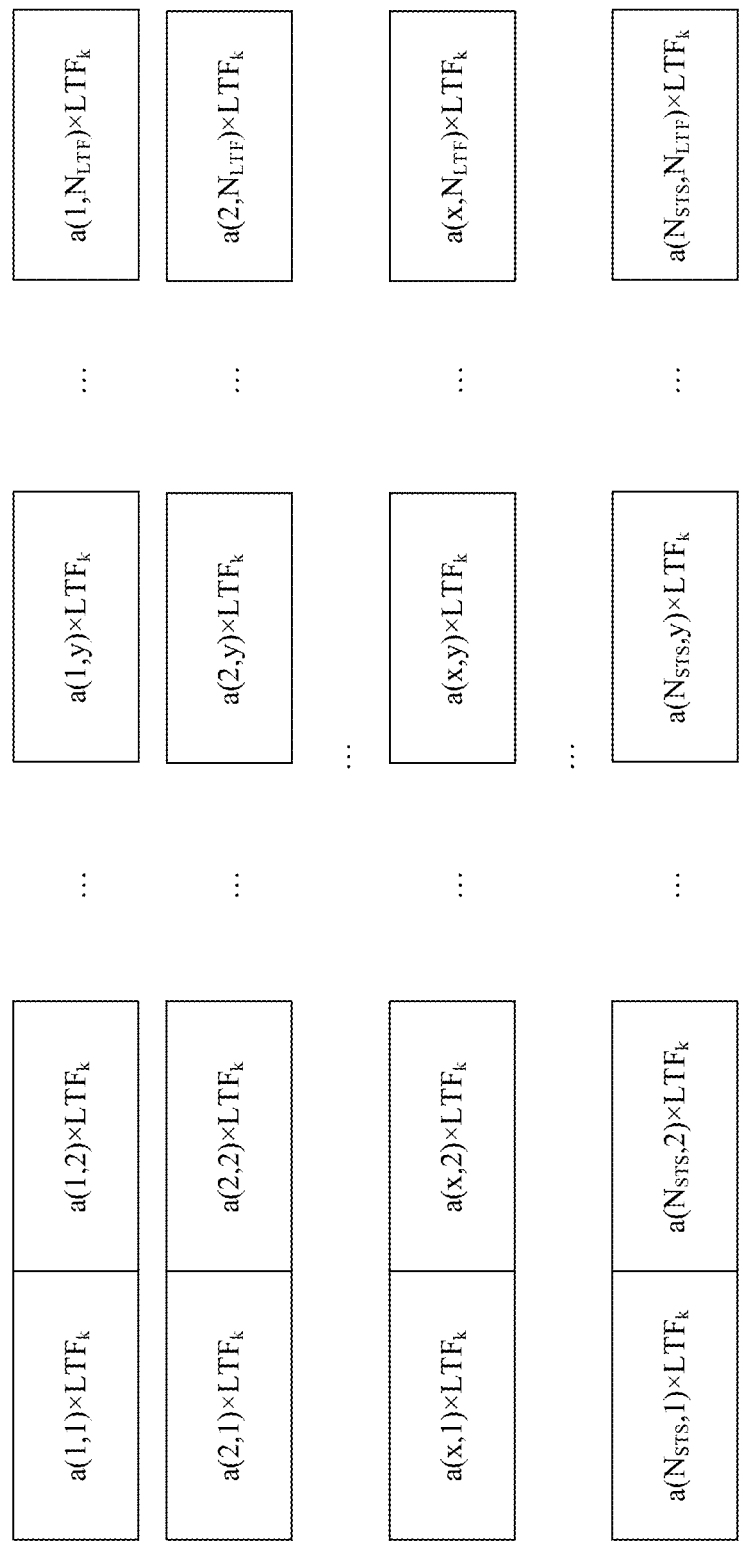
FIG. 7 is a schematic diagram of a scenario in which a P matrix is multiplied by a long training field (LTF) sequence.

FIG. 7 is a schematic diagram of a scenario in which a P matrix is multiplied by an LTF sequence, where a(x,y) is the $y^{th}$ element in the $x^{th}$ row of the A matrix. LTF$_k$ of the $x^{th}$ row and the $y^{th}$ column is a sequence value of the $k^{th}$ subcarrier in the $y^{th}$ EHT-LTF sequence of the $x^{th}$ stream on the $k^{th}$ subcarrier.

When the $k^{th}$ subcarrier is a data subcarrier, the $y^{th}$ element in the $x^{th}$ row of the P matrix is multiplied by the sequence value of the $k^{th}$ subcarrier in the $y^{th}$ EHT-LTF sequence sent on the $x^{th}$ stream on the $k^{th}$ subcarrier.

In this way, the sending apparatus may obtain a frequency domain matrix of frequency domain signals that need to be sent on each data subcarrier. The frequency domain matrix is an $N_{SS} \times N_{LTF}$ matrix. In other words, a quantity of rows of the frequency domain matrix is the quantity of spatial streams $N_{SS}$, and a quantity of columns is the quantity of EHT-LTF symbols $N_{LTF}$. Each row of the frequency domain matrix is a frequency domain signal transmitted on each stream. In this case, by performing step (b), the sending apparatus may obtain a frequency domain signal transmitted on each of the multiple streams sent on each subcarrier.

The sending apparatus may store the P matrix or store information that can be used to obtain the P matrix. In this way, when the sending apparatus needs to multiply a P matrix by an EHT-LTF sequence, the sending apparatus may directly use the stored P matrix, or obtain the P matrix based on the stored information used to obtain the P matrix. When an R matrix needs to be used, the sending apparatus can also obtain the R matrix based on the obtained P matrix. For example, the P matrix or the information that can be used to obtain the P matrix may be stored in a memory of the sending apparatus.

(c) CSD: Apply CSD for each spatial stream.

When the PPDU is sent, EHT-LTFs are sent on multiple spatial streams of each subcarrier, and different CSDs are set for different spatial streams.

For example, CSD of the first spatial stream is 0, CSD of the second spatial stream is −400 ns, and CSD of the second spatial stream is −200 ns. The rest may be deduced by analogy.

(d) Spatial stream mapping: Apply a Q matrix.

A quantity of transmit antennas of the sending device is Nmax. When Nmax is greater than the quantity of spatial streams $N_{SS}$ of the PPDU, the frequency domain matrix obtained in step (b) may be multiplied by the Q matrix. The Q matrix is an Nmax×$N_{SS}$ matrix. An X×Y matrix mentioned in this application may be understood as a matrix with X rows and Y columns. In other words, the Q matrix has Nmax rows and $N_{SS}$ columns. In this way, the frequency domain matrix obtained in step (b) is multiplied by the Q matrix, and the sending device may obtain an Nmax×$N_{LTF}$ matrix. Each row of the matrix corresponds to a frequency domain signal sent by one transmit antenna for channel estimation. In other words, the sending device may obtain a frequency domain signal sent by each of the plurality of transmit antennas of the sending device for channel estimation. The quantity of transmit antennas Nmax of the sending device is greater than or equal to a maximum quantity of spatial streams that can be supported.

It should be understood that step (d) is an optional step.

(e) Inverse discrete Fourier transform (IDFT).

Perform inverse Fourier calculation on the frequency domain signal obtained in steps (a) to (c) or steps (a) to (d), to obtain a time domain signal. Based on the frequency domain signal transmitted on each spatial stream obtained in steps (a) to (c) or steps (a) to (d), EHT-LTF transmit signals of multiple OFDM symbols used for channel estimation and transmitted on each spatial stream is obtained.

(f) Insert a guard interval (GI) and apply windowing: Determine a length of the guard interval based on a guard interval type (GI_TYPE) indicated by a TXVECTOR parameter, and apply windowing for each transmitted OFDM symbol.

(g) Radio frequency: Upconvert a complex baseband signal to a specified frequency and bandwidth.

Figure 8:
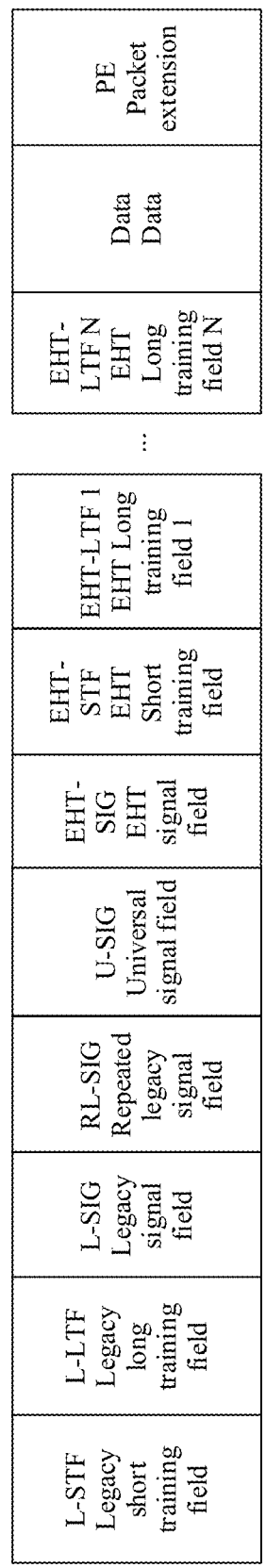
FIG. 8 is a schematic diagram depicting a structure of a PPDU.

EHT-LTFs of multiple OFDM symbols may be obtained according to the foregoing steps of EHT-LTF generation. Optionally, the PPDU includes a legacy short training field (L-STF), a legacy long training field (L-LTF), a legacy signal field (L-SIG), a repeated legacy signal field (RL-SIG), a universal signal field U-SIG, an extremely high throughput signal field or an extremely high throughput signal field (EHT-SIG), an EHT short training field (EHT-STF), one or more EHT-LTFs, data, and a data packet extension (PE). The L-STF, the L-LTF, the L-SIG, the RL-SIG, the U-SIG, the EHT-SIG, the EHT-STF, and the EHT-LTF are a part of structures in a physical layer header (or referred to as a preamble part) of the PPDU. FIG. 8 is a schematic diagram depicting a structure of a PPDU. The PPDU may include EHT-LTFs of multiple symbols.

The L-STF, the L-LTF, and the L-SIG may be understood as legacy preamble fields, and are used to ensure coexistence of a new device and a legacy device. The RL-SIG is used to increase reliability of a legacy signal field.

The U-SIG and the EHT-SIG are signaling fields. The U-SIG is used to carry some common information, for example, information indicating a PPDU version, information indicating an uplink/downlink, information indicating a frequency domain bandwidth of the PPDU, and puncturing indication information. The EHT-SIG includes information indicating resource allocation, information indicating data demodulation, and the like.

502. The sending apparatus sends the PPDU.

The sending apparatus may transmit, by using a radio frequency circuit, the signal obtained through up-conversion in the foregoing step (g).

A corresponding receiving apparatus receives the PPDU. The foregoing step (g) may also be analog and radio frequency, that is, step (g) may be: Upconvert a complex baseband signal to a specified frequency and bandwidth, and transmit the signal by using a radio frequency circuit.

503. A receiving apparatus performs channel estimation based on the EHT-LTF in the PPDU.

The receiving apparatus calculates a channel $H_k$ of the $k^{th}$ subcarrier based on the EHT-LTF in the PPDU. $H_k = Y_k P^H / LTF_k$. $P^H$ is a transposed matrix of the P matrix.

The receiving apparatus stores at least one of the transposed matrix $P^H$ of the P matrix, the P matrix, or the information that can be used to obtain the P matrix or the transposed matrix $P^H$ of the P matrix. In this way, when the sending apparatus needs to obtain $H_k$ by using the transposed matrix $P^H$ of the P matrix, the sending apparatus may directly use the stored P matrix or the transposed matrix $P^H$ of the P matrix, or obtain the P matrix based on the stored information used to obtain the P matrix or the transposed matrix $P^H$ of the P matrix. For example, the transposed matrix $P^H$ of the P matrix, the P matrix, or the information that can be used to obtain the P matrix or the transposed matrix $P^H$ of the P matrix may be stored in a memory of the sending apparatus.

In some embodiments, optionally, the sending apparatus may be an AP or a STA, or a chip in an AP or a STA. The receiving apparatus may be an AP or a STA, or a chip in an AP or a STA. The sending apparatus may be understood as a transmission apparatus for PPDU sending, and the receiving apparatus may be understood as a transmission apparatus for PPDU receiving.

An order of the P matrix in the technical solution in some embodiments is greater than 8. When there are more than eight spatial streams, channel estimation can be performed on a channel with multiple spatial streams greater than eight streams, so that the sending apparatus can transmit data on more than eight streams, improving data transmission efficiency. In addition, the first row of the P matrix includes an element whose value is 1 and an element whose value is −1. This can also avoid a spectrum protrusion of a pilot subcarrier caused because values of elements in the first row of the P matrix are all 1.

Optionally, a value of any element in the P matrix in this application is 1, −1, j, or −j, and j is an imaginary unit. It may be understood that the imaginary unit may also be represented by another letter (for example, a letter "i"). In other words, an element in the P matrix has a value of only 1, −1, j, and −j. The element value is simple, so that a calculation process of multiplying the element in the P matrix by the EHT-LTF sequence is simplified. The element in the P matrix simply includes only 1, −1, j, and −j, greatly reducing calculation complexity of EHT-LTF field generation and calculation complexity of channel estimation performed by the receiving apparatus that receives the PPDU.

Optionally, in this application, when n is 12, a value of any element in the P matrix is 1 or −1. In other words, when n is 12, a value of an element in the P matrix has only two cases: 1 and −1. In this way, the element value of the P matrix is simplified, accelerating calculation of multiplying the P matrix by the EHT-LTF sequence.

In any embodiment of this application, row transformation may be, for example, but is not limited to, at least one of the following two transformations:

Row transformation 1: Exchange positions of at least two rows in a matrix.

Row transformation 2: Multiply elements in at least one row of a matrix by −1, j, or −j.

Similarly, in any embodiment of this application, column transformation may be, for example, but is not limited to, at least one of the following two transformations:

Column transformation 1: Exchange positions of at least two columns in a matrix.

Column transformation 2: Multiply elements in at least one column of a matrix by −1, j, or −j.

It should be understood that the row transformation and/or the column transformation do/does not affect orthogonality of the matrix. In other words, the orthogonal matrix is still an orthogonal matrix after the foregoing row transformation and/or column transformation are/is performed.

An X-order matrix mentioned in this application may be understood as an X×X matrix, or a matrix with X rows and X columns. X is a positive integer.

Embodiments of this application provide some P matrices with special structures. The sending apparatus and the receiving apparatus may store only related information used to obtain the P matrix, and do not need to store the complete P matrix, so that storage load of the sending apparatus and the receiving apparatus can be reduced, and the P matrix can be generated more easily. Certainly, from a perspective of implementation, the transceiver apparatus (the sending apparatus and the receiving apparatus) may also store the P matrix.

In some embodiments of this application, an n-order P matrix is obtained through multiplying at least one column of an n-order P1 matrix by −1, or the P matrix is obtained through multiplying at least one column of the n-order P1 matrix by −1 and performing row transformation and/or another column transformation on the n-order P1 matrix, or may be obtained through performing row transformation for a plurality of times and/or another column transformation for a plurality of times on the n-order P1 matrix. The another column transformation refers to column transformation other than column transformation of multiplying elements of at least one column of the P1 matrix by −1, for example, may include multiplying elements of at least one column of the P1 matrix by j or −j, and exchanging positions of at least two columns in the P matrix.

The P1 matrix includes a block matrix being an (n−1)-order Toeplitz matrix. A matrix type of the (n−1)-order Toeplitz matrix is at least one of the following:

$a(x,y)=-a(y,x)$ in the (n−1)-order Toeplitz matrix, where $a(x,y)$ is an element in an $x^{th}$ row and a $y^{th}$ column in the (n−1)-order Toeplitz matrix, $a(y,x)$ is an element in a $y^{th}$ row and an $x^{th}$ column in the (n−1)-order Toeplitz matrix, and $x \neq y$.

Alternatively, the (n−1)-order Toeplitz matrix is a circulant matrix.

Elements on a main diagonal of the Toeplitz matrix are equal, and elements on a line parallel to the main diagonal are also equal. For example, a structure of an n-order Toeplitz matrix $T_{n \times n}$ may be as follows:

$$T_{n \times n} = \begin{bmatrix} t_0 & t_1 & t_2 & \cdots & t_{n-1} \\ t_{-1} & t_0 & t_1 & \cdots & t_{n-2} \\ t_{-2} & t_{-1} & t_0 & \cdots & t_{n-3} \\ \cdots & \cdots & \cdots & \cdots & \cdots \\ t_{-n+1} & t_{-n+2} & t_{-n+3} & \cdots & t_0 \end{bmatrix}.$$

The circulant matrix is a Toeplitz matrix with $t_{n-1}=t_{-i}$, where $1 \leq i \leq n$.

When n=12, elements in the first row and elements in the first column of the 12-order P1 matrix may all be 1. For example, a communication standard may specify that the 12-order P matrix is obtained through multiplying a column or columns of the 12-order P1 matrix by −1. Optionally, the communication standard may specify that the 12-order P matrix is obtained through multiplying columns 2, 6, and 10 of the 12-order P1 matrix by −1.

In this way, the sending apparatus and the receiving apparatus may store only a vector of a first row and/or a vector of a first column of an 11-order Toeplitz matrix, obtain the 11-order Toeplitz matrix based on the vector of the first row and/or the vector of the first column, and the matrix type, to obtain the 12-order P1 matrix, and then multiply the columns 2, 6, and 10 of the 12-order P1 matrix by −1 to obtain the P matrix. In other words, when n is 12, the sending apparatus and the receiving apparatus may store only the vector of the first row and/or the vector of the first column of the 11-order Toeplitz matrix, to obtain the 12-order P matrix, without storing the complete 12-order P matrix, saving storage resources of the sending apparatus and the receiving apparatus. Certainly, from a perspective of solution implementation, the sending apparatus and the receiving apparatus may alternatively store the complete 11-order Toeplitz matrix, or store the complete 12-order P1 matrix, or store the complete 12-order P matrix.

The communication standard may further specify that the elements in the first row and the elements in the first column of the 12-order P1 matrix are all 1, and specify that the matrix type of the 11-order Toeplitz matrix included in the 12-order P1 matrix is at least one of the following: an (n−1)-order Toeplitz matrix is a symmetric matrix; $a(x,y)=-a(y,x)$ in an (n−1)-order Toeplitz matrix, where $a(x,y)$ is an element in an $x^{th}$ row and a $y^{th}$ column of a P matrix, $a(y,x)$ is an element in a $y^{th}$ row and an $x^{th}$ column in the P matrix, and $x \neq y$; or an (n−1)-order Toeplitz matrix is a circulant matrix.

The following describes some implementations related to the 12-order P1 matrix provided in some embodiments.

In a possible implementation, when n is 12, the (n−1)-order Toeplitz matrix (that is, the 11-order Toeplitz matrix) is a circulant matrix, and the first row of the 11-order Toeplitz matrix is one of a vector α=[1, −1, 1, 1, 1, −1, −1, −1, 1, −1, −1], b=[1, 1, −1, 1, −1, −1, 1, −1, −1, −1, 1], a vector obtained after a cyclic shift of α, or a vector obtained after a cyclic shift of b; or the first column of the 11-order Toeplitz matrix is one of a vector ā=[1, −1, −1, 1, −1, −1, −1, 1, 1, 1, −1]$^T$, a vector b̄=[−1, 1, −1, −1, 1, −1, 1, 1, 1, −1, $-1]^T$, a vector obtained after a cyclic shift of $\bar{a}$, or a vector obtained after a cyclic shift of $\bar{b}$.

When n is 12, the vector of the first row of the 11-order Toeplitz matrix is one of the following 22 row vectors when the 11-order Toeplitz matrix is a circulant matrix; and/or the vector of the first column of the 11-order Toeplitz matrix is one of the following 22 column vectors when the 11-order Toeplitz matrix is a circulant matrix.

The 22 row vectors are as follows:
[1, −1, 1, 1, 1, −1, −1, −1, 1, −1, −1]; [−1, 1, −1, 1, 1, 1, −1, −1, −1, 1, −1];
[−1, −1, 1, −1, 1, 1, 1, −1, −1, −1, 1]; [1, −1, −1, 1, −1, 1, 1, 1, −1, −1, −1];
[−1, 1, −1, −1, 1, −1, 1, 1, 1, −1, −1]; [−1, −1, 1, −1, −1, 1, −1, 1, 1, 1, −1];
[−1, −1, −1, 1, −1, −1, 1, −1, 1, 1, 1]; [1, −1, −1, −1, 1, −1, −1, 1, −1, 1, 1];
[1, 1, −1, −1, −1, 1, −1, −1, 1, −1, 1]; [1, 1, 1, −1, −1, −1, 1, −1, −1, 1, −1];
[−1, 1, 1, 1, −1, −1, −1, 1, −1, −1, 1]; [1, −1, 1, 1, −1, −1, −1, −1, 1, −1, −1, 1];
[1, −1, 1, −1, −1, 1, −1, −1, −1, 1, 1]; [−1, 1, −1, −1, 1, −1, −1, −1, 1, 1, 1];
[1, −1, −1, 1, −1, −1, −1, 1, 1, 1, −1]; [−1, 1, −1, −1, 1, 1, 1, −1, 1, −1, −1];
[−1, 1, −1, −1, −1, 1, 1, 1, −1, 1, −1]; [1, −1, −1, −1, 1, 1, 1, −1, 1, −1, −1, 1, 1, 1, −1, 1, −1];
[−1, −1, −1, 1, 1, 1, −1, 1, −1, −1, 1]; [−1, −1, 1, 1, 1, −1, 1, −1, −1, 1, −1];
[−1, 1, 1, 1, −1, 1, −1, −1, 1, −1, −1]; and [1, 1, 1, −1, 1, −1, −1, 1, −1, −1, −1].

The 22 column vectors are as follows:
$[1, -1, -1, 1, -1, -1, -1, 1, 1, 1, -1]^T$; $[-1, 1, -1, -1, 1, -1, -1, -1, 1, 1, 1]^T$;
$[1, -1, 1, -1, -1, 1, -1, -1, -1, 1, 1]^T$; $[1, 1, -1, 1, -1, -1, 1, -1, -1, -1, 1]^T$;
$[1, 1, 1, -1, 1, -1, -1, 1, -1, -1, -1]^T$; $[-1, 1, 1, 1, -1, 1, -1, -1, 1, -1, -1]^T$;
$[-1, -1, 1, 1, 1, -1, 1, -1, -1, 1, -1]^T$; $[-1, -1, -1, 1, 1, 1, -1, 1, -1, -1, 1]^T$;
$[1, -1, -1, -1, 1, 1, 1, -1, 1, -1, -1]^T$; $[\mathbf{-1, 1, -1, -1, -1, 1, 1, 1, -1, 1, -1}]^T$;
$[-1, -1, 1, -1, -1, -1, 1, 1, 1, -1, 1]^T$; $[-1, 1, -1, 1, -1, -1, -1, 1, 1, 1, -1]^T$;
$[-1, -1, 1, -1, 1, -1, -1, -1, 1, 1, 1]^T$; $[1, -1, -1, 1, -1, 1, -1, -1, -1, 1, 1]^T$;
$[1, 1, -1, -1, 1, -1, 1, -1, -1, -1, 1]^T$; $[1, 1, 1, -1, -1, 1, -1, 1, -1, -1, -1]^T$;
$[1, 1, 1, -1, -1, -1, 1, -1, 1, -1, -1]^T$; $[-1, 1, 1, 1, -1, -1, -1, 1, -1, 1, -1]^T$;
$[1, -1, 1, 1, 1, -1, -1, -1, 1, -1, 1]^T$; $[-1, 1, -1, 1, 1, 1, -1, -1, -1, 1, -1]^T$;
$[-1, -1, 1, -1, 1, 1, 1, -1, -1, -1, 1]^T$; and $[1, -1, -1, 1, -1, 1, 1, 1, -1, -1, -1]^T$.

When the elements in the first row and the elements in the first column of the 12-order P1 matrix are all 1, the 11-order Toeplitz matrix is a circulant matrix, and the vector of the first row of the 11-order Toeplitz matrix is one of the foregoing 22 row vectors, the 12-order P1 matrix is an orthogonal matrix. In this way, the 12-order P matrix obtained through multiplying at least one column of the 12-order P1 matrix by −1 is also an orthogonal matrix. It may be understood that, the foregoing 22 vectors are row vectors of the first row of the 11-order Toeplitz matrix that can ensure an orthogonal 12-order P1 matrix when the elements in the first row and the elements in the first column of the 12-order P1 matrix are all 1, and the 11-order Toeplitz matrix in the lower right corner of the 12-order P1 matrix is a circulant matrix.

For example, when n is 12, the 11-order Toeplitz matrix is a circulant matrix, the vector of the first row of the 11-order Toeplitz matrix is the first row vector $\alpha$ [1, −1, 1, 1, 1, −1, −1, −1, 1, −1, −1] in the foregoing 22 row vectors; the vector of the second row of the 11-order Toeplitz matrix is a vector [−1, 1, −1, 1, 1, 1, −1, −1, −1, 1, −1] obtained through performing a rightward 1-bit cyclic shift on the vector $\alpha$; the vector of the third row of the 11-order Toeplitz matrix is a vector [−1, −1, 1, −1, 1, 1, 1, −1, −1, −1, 1] obtained through performing a rightward 2-bit cyclic shift on the vector $\alpha$; . . . ; the vector of the $K^{th}$ row of the 11-order Toeplitz matrix is a vector obtained through performing a rightward (K−1)-bit cyclic shift on the vector $\alpha$; . . . ; and the vector of the eleventh row of the 11-order Toeplitz matrix is a vector [−1, 1, 1, 1, −1, −1, −1, 1, −1, −1, 1] obtained through performing a rightward 10-bit cyclic shift on the vector $\alpha$, where K is a positive integer and K is less than or equal to 11. In this way, the 12-order P1 matrix corresponding to the vector $\alpha$ may be:

$$P1_{12\times 12} = \begin{bmatrix} 1 & 1 & 1 & 1 & 1 & 1 & 1 & 1 & 1 & 1 & 1 & 1 \\ 1 & 1 & -1 & 1 & 1 & 1 & -1 & -1 & -1 & 1 & -1 & -1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \end{bmatrix}.$$

When the elements in the first row and the elements in the first column of the 12-order P1 matrix are all 1, the 11-order Toeplitz matrix is a circulant matrix, and the vector of the first column of the 11-order Toeplitz matrix is one of the foregoing 22 column vectors, the 12-order P1 matrix is an orthogonal matrix. In this way, the 12-order P matrix obtained through multiplying at least one column of the 12-order P1 matrix by −1 is also an orthogonal matrix. The foregoing 22 vectors are column vectors of the first column of the 11-order Toeplitz matrix that can ensure an orthogonal 12-order P1 matrix when the elements in the first row and the elements in the first column of the 12-order P1 matrix are all 1, and the 11-order Toeplitz matrix in the lower right corner of the 12-order P1 matrix is a circulant matrix.

The vector of the first column of the 11-order Toeplitz matrix is the first column vector $\bar{a}=[1, -1, -1, 1, -1, -1, -1, 1, 1, 1, -1]^T$ in the foregoing 22 column vectors; the vector of the second column of the 11-order Toeplitz matrix is a vector $[-1, 1, -1, -1, 1, -1, -1, -1, 1, 1, 1]^T$ obtained through performing a rightward 1-bit cyclic shift on $\bar{a}$; the vector of the third column of the 11-order Toeplitz matrix is a vector $[1, -1, 1, -1, -1, 1, -1, -1, -1, 1, 1]^T$ obtained through performing a rightward 2-bit cyclic shift on $\bar{a}$; . . . ; the vector of the $K^{th}$ column of the 11-order Toeplitz matrix is a vector obtained through performing a rightward (K−1)-bit cyclic shift on $\bar{a}$; . . . ; and the vector of the eleventh column of the 11-order Toeplitz matrix is a vector $[-1, -1, 1, -1, -1, -1, 1, 1, 1, -1, 1]^T$ obtained through performing a rightward 10-bit cyclic shift on $\bar{a}$, where K is a positive integer and K is less than or equal to 11.

In this way, when the vector $\bar{a}$ is the vector of the first column of the 11-order Toeplitz matrix, the 12-order P1 matrix formed is the same as the 12-order P1 matrix formed when the vector $\alpha$ is the vector of the first row of the 11-order Toeplitz matrix. In other words, the 12-order P1 matrix constructed based on the first row vector in the 22 row vectors is the same as the 12-order P1 matrix constructed based on the first column vector in the 22 column vectors.

Similarly, in some embodiments, the P1 matrix constructed based on the $K^{th}$ row vector in the 22 row vectors is the same as the 12-order P1 matrix constructed based on the $K^{th}$ column vector in the 22 column vectors. Each of the 22 row vectors can be used to construct a P1 matrix, and each of the 22 column vectors can be used to construct a P1 matrix. The 22 row vectors and the 22 column vectors can be used to construct 22 different 12-order PT matrices in total.

In a manner similar to obtaining the P1 matrix constructed based on the vector $\alpha$ or $\bar{a}$ in the foregoing example, the sending apparatus may also obtain a 12-order P1 matrix based on any one of the 22 row vectors or any one of the 22 column vectors, to obtain a 12-order P1 matrix. 12-order P1 matrices obtained based on each row vector and each column vector are not enumerated herein.

In some other possible implementations, when n is 12, $a(x,y)=-a(y,x)$ in the (n−1)-order Toeplitz matrix (that is, the 11-order Toeplitz matrix), where $a(x,y)$ is an element in an $x^{th}$ row and a $y^{th}$ column in the 11-order Toeplitz matrix, and $a(y,x)$ is an element in a $y^{th}$ row and an $x^{th}$ column in the 11-order Toeplitz matrix, and $x \neq y$. The first row of the 11-order Toeplitz matrix is [1, −1, 1, −1, −1, −1, 1, 1, 1, −1, −1] or [1, 1, −1, 1, 1, 1, −1, −1, −1, 1, −1]. The first column of the 11-order Toeplitz matrix is [1, 1, −1, 1, 1, 1, −1, −1, −1, 1, −1]$^T$ or [1, −1, 1, −1, −1, −1, 1, 1, 1, −1, 1]$^T$.

Elements in the first row of the 12-order P1 matrix are all 1, and elements in the second to the twelfth rows and in the first column are all −1. When $a(x,y)=-a(y,x)$ in the 11-order Toeplitz matrix, and $x \neq y$, elements on a diagonal are all 1, and the vector of the first row of the 11-order Toeplitz matrix is one of the foregoing two vectors, the 12-order P1 matrix is an orthogonal matrix. In this way, the P matrix obtained through multiplying at least one column of the 12-order P1 by −1 is also an orthogonal matrix.

For example, when n is 12, $a(x,y)=-a(y,x)$ in the 11-order Toeplitz matrix, and $x \neq y$, and the vector of the first row of the 11-order Toeplitz matrix is [1, −1, 1, −1, −1, −1, 1, 1, 1, −1, −1], a 12-order P1 matrix corresponding to the vector may be:

$$\begin{bmatrix} 1 & 1 & 1 & 1 & 1 & 1 & 1 & 1 & 1 & 1 & 1 & 1 \\ -1 & 1 & -1 & 1 & -1 & -1 & -1 & 1 & 1 & 1 & -1 & 1 \\ -1 & 1 & 1 & -1 & 1 & -1 & -1 & -1 & 1 & 1 & 1 & -1 \\ -1 & -1 & 1 & 1 & -1 & 1 & -1 & -1 & -1 & 1 & 1 & 1 \\ -1 & 1 & -1 & 1 & 1 & -1 & 1 & -1 & -1 & -1 & 1 & 1 \\ -1 & 1 & 1 & -1 & 1 & 1 & -1 & 1 & -1 & -1 & -1 & 1 \\ -1 & 1 & 1 & 1 & -1 & 1 & 1 & -1 & 1 & -1 & -1 & -1 \\ -1 & -1 & 1 & 1 & 1 & -1 & 1 & 1 & -1 & 1 & -1 & -1 \\ -1 & -1 & -1 & 1 & 1 & 1 & -1 & 1 & 1 & -1 & 1 & -1 \\ -1 & -1 & -1 & -1 & 1 & 1 & 1 & -1 & 1 & 1 & -1 & 1 \\ -1 & 1 & -1 & -1 & -1 & 1 & 1 & 1 & -1 & 1 & 1 & -1 \\ -1 & -1 & 1 & -1 & -1 & -1 & 1 & 1 & 1 & -1 & 1 & 1 \end{bmatrix}$$

When n is 12, $a(x,y)=-a(y,x)$ in the 11-order Toeplitz matrix, and $x \neq y$, and the vector of the first row of the 11-order Toeplitz matrix is [1, 1, −1, 1, 1, 1, −1, −1, −1, 1, −1], another corresponding 12-order P1 matrix is as follows:

$$\begin{bmatrix} 1 & 1 & 1 & 1 & 1 & 1 & 1 & 1 & 1 & 1 & 1 & 1 \\ -1 & 1 & 1 & -1 & 1 & 1 & 1 & -1 & -1 & -1 & 1 & -1 \\ -1 & -1 & 1 & 1 & -1 & 1 & 1 & 1 & -1 & -1 & -1 & 1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & 1 & -1 & 1 & 1 & -1 & 1 & 1 & 1 & -1 \\ -1 & -1 & -1 & -1 & 1 & -1 & 1 & 1 & -1 & 1 & 1 & 1 \\ -1 & 1 & -1 & -1 & -1 & 1 & -1 & 1 & 1 & -1 & 1 & 1 \\ -1 & 1 & 1 & -1 & -1 & -1 & 1 & -1 & 1 & 1 & -1 & 1 \\ -1 & 1 & 1 & 1 & -1 & -1 & -1 & 1 & -1 & 1 & 1 & -1 \\ -1 & -1 & 1 & 1 & 1 & -1 & -1 & -1 & 1 & -1 & 1 & 1 \\ -1 & 1 & -1 & 1 & 1 & 1 & -1 & -1 & -1 & 1 & -1 & 1 \end{bmatrix}$$

Some embodiments is not limited to that the elements in the first row of the 12-order P1 matrix are all 1, and is not limited to that the vector of the first row of the 11-order Toeplitz matrix is definitely the 22 vectors in the foregoing example or the two vectors in the foregoing example.

Another vector of the first row of the 11-order Toeplitz matrix that can ensure an orthogonal 12-order P1 matrix and a matrix type being any one of the foregoing types of the 11-order Toeplitz matrix types is also an implementation of the technical solution in some embodiments.

Optionally, for example, the elements in the first row of the 12-order P1 matrix may include a combination of one or more elements whose values are 1 and one or more elements whose values are −1. In this case, the 12-order P matrix may also be the same as the 12-order PT matrix.

When n is 14, the n-order (14-order) P1 matrix includes a (n−1)-order (13-order) Toeplitz matrix, and the 13-order Toeplitz matrix is a circulant matrix and a symmetric matrix.

Elements in the first row and elements in the first column of the 14-order P1 matrix are all 1. In this way, the sending apparatus may obtain the 13-order Toeplitz matrix by obtaining only elements in one row and/or one column of the 13-order Toeplitz matrix, to obtain the 14-order P1 matrix. Then a 14-order P matrix (14×14 P matrix) can be obtained through multiplying at least one column (for example, columns 2, 4, 6, 10, and 14) of the 14-order P1 matrix is multiplied by −1. In other words, the sending apparatus and the receiving apparatus only need to store elements in one row and/or one column of the 13-order Toeplitz matrix, without storing a complete P matrix, so that the 14-order P matrix can be obtained based on the elements in one row and/or one column of the 13-order Toeplitz matrix, saving storage resources of the sending apparatus and the receiving apparatus. For example, the sending apparatus and the receiving apparatus may store only elements in the vector of the first row of the 13-order Toeplitz matrix. The vector of the first row may be c=[−1, −j, j, −j, j, j, j, j, −j, −j, j, −j], or d=[−1, j, −j, j, j, −j, −j, −j, −j, j, j, −j, j] Certainly, from a perspective of some solution implementations, the sending apparatus and the receiving apparatus may also store the complete 13-order Toeplitz matrix, the complete 14-order P1 matrix, or the complete 14-order P matrix. Alternatively, the first column of the 13-order Toeplitz matrix is one of a vector $c^T$=[−1, −j, j, −j, −j, j, j, j, j, −j, −j, j, −j]$^T$, $d^T$=[−1, j, −j, j, j, −j, −j, −j, −j, j, j, −j, j]$^T$, a vector obtained after a cyclic shift of $c^T$, or a vector obtained after a cyclic shift of $d^T$.

Optionally, a communication standard may specify that the elements in the first row and the elements in the first column of the 14-order P1 matrix are all 1, and specify that the 14-order P1 matrix includes a 13-order Toeplitz matrix in the lower right corner, and the 13-order Toeplitz matrix is a circulant matrix and a symmetric matrix.

For example, the 14-order P1 matrix is:

$$Pl_{14\times 14} = \begin{bmatrix} 1 & 1 & 1 & 1 & 1 & 1 & 1 & 1 & 1 & 1 & 1 & 1 & 1 & 1 \\ 1 & -1 & -j & j & -j & -j & j & j & j & j & -j & -j & j & -j \\ 1 & -j & -1 & -j & j & -j & -j & j & j & j & j & -j & -j & j \\ 1 & j & -j & -1 & -j & j & -j & -j & j & j & j & j & -j & -j \\ 1 & -j & j & -j & -1 & -j & j & -j & -j & j & j & j & j & -j \\ 1 & -j & -j & j & -j & -1 & -j & j & -j & -j & j & j & j & j \\ 1 & j & -j & -j & -j & -j & -1 & -j & j & -j & -j & j & j & j \\ 1 & j & j & -j & -j & j & -j & -1 & -j & j & -j & -j & j & j \\ 1 & j & j & j & -j & -j & j & -j & -1 & -j & j & -j & -j & j \\ 1 & j & j & j & j & -j & -j & j & -j & -1 & -j & j & -j & -j \\ 1 & -j & j & j & j & j & -j & -j & j & -j & -1 & -j & j & -j \\ 1 & -j & -j & j & j & j & j & -j & -j & j & -j & -1 & -j & j \\ 1 & j & -j & -j & j & j & j & j & -j & -j & j & -j & -1 & -j \\ 1 & -j & j & -j & -j & j & j & j & j & -j & -j & j & -j & -1 \end{bmatrix}, \text{or}$$

$$Pl_{14\times 14} = \begin{bmatrix} 1 & 1 & 1 & 1 & 1 & 1 & 1 & 1 & 1 & 1 & 1 & 1 & 1 & 1 \\ 1 & -1 & j & -j & j & j & -j & -j & -j & -j & j & j & -j & j \\ 1 & j & -1 & j & -j & j & j & -j & -j & -j & -j & j & j & -j \\ 1 & -j & j & -1 & j & -j & j & j & -j & -j & -j & -j & j & j \\ 1 & j & -j & j & -1 & j & -j & j & j & -j & -j & -j & -j & j \\ 1 & j & j & -j & j & -1 & j & -j & j & j & -j & -j & -j & -j \\ 1 & -j & j & j & -j & j & -1 & j & -j & j & j & -j & -j & -j \\ 1 & -j & -j & j & j & -j & j & -1 & j & -j & j & j & -j & -j \\ 1 & -j & -j & -j & j & j & -j & j & -1 & j & -j & j & j & -j \\ 1 & -j & -j & -j & -j & j & j & -j & j & -1 & j & -j & j & j \\ 1 & j & -j & -j & -j & -j & j & j & -j & j & -1 & j & -j & j \\ 1 & j & j & -j & -j & -j & -j & j & j & -j & j & -1 & j & -j \\ 1 & -j & j & j & -j & -j & -j & -j & j & j & -j & j & -1 & j \\ 1 & j & -j & j & j & -j & -j & -j & -j & j & j & -j & j & -1 \end{bmatrix}.$$

When n is 16, the n-order (16-order) P1 matrix includes a (n−1)-order Toeplitz matrix (that is, a 15-order Toeplitz matrix). The 15-order Toeplitz matrix is a circulant matrix.

Elements in the first row and elements in the first column of the 16-order P1 matrix may all be 1. For example, a communication standard may specify that the 16-order P matrix is obtained through multiplying a column or columns of the 16-order P1 matrix by −1. Optionally, the communication standard may specify that the 16-order P matrix is obtained through multiplying columns 2, 6, 10, and 14 of the 16-order P1 matrix by −1.

In this way, the sending apparatus and the receiving apparatus may store only a vector of a first row and/or a vector of a first column of a 15-order Toeplitz matrix, obtain the 15-order Toeplitz matrix based on the vector of the first row and/or the vector of the first column, and the matrix type, to obtain the 16-order P1 matrix, and then multiply the columns 2, 6, 10, and 14 of the 16-order P1 matrix by −1 to obtain the P matrix. In other words, when n is 15, the sending apparatus and the receiving apparatus may store only the vector of the first row and/or the vector of the first column of the 11-order Toeplitz matrix, to obtain the 16-order P matrix, without storing the complete 16-order P matrix, saving storage resources of the sending apparatus and the receiving apparatus. Certainly, from a perspective of solution implementation, the sending apparatus and the receiving apparatus may alternatively store the complete 15-order Toeplitz matrix, or store the complete 16-order P1 matrix, or store the complete 16-order P matrix.

The communication standard may further specify that the elements in the first row and the elements in the first column of the 16-order P1 matrix are all 1, and specify that the matrix type of the 15-order Toeplitz matrix included in the 16-order P1 matrix is circulant matrix.

The following describes some implementations related to the 16-order P1 matrix provided in some embodiments.

In a possible implementation, when n is 16, the (n−1)-order Toeplitz matrix (that is, the 15-order Toeplitz matrix) is a circulant matrix, and the first row of the 15-order Toeplitz matrix is one of a vector e=[1, 1, 1, −1, 1, 1, −1, −1, 1, −1, 1, −1, −1, −1, −1], f=[1, 1, 1, −1, −1, −1, −1, 1, −1, 1, −1, −1, 1, 1, −1], a vector obtained after a cyclic shift of e, or a vector obtained after a cyclic shift of f; or the first column of the (n−1)-order Toeplitz matrix is one of a vector $\bar{e}$=[1, −1, −1, −1, −1, 1, −1, 1, −1, −1, 1, 1, −1, 1, 1]$^T$ a vector $\bar{f}$=[1, −1, 1, 1, −1, −1, 1, −1, 1, −1, −1, −1, −1, 1, 1]$^T$, a vector obtained after a cyclic shift of $\bar{a}$, or a vector obtained after a cyclic shift of $\bar{f}$.

When n is 16, the vector of the first row of the 15-order Toeplitz matrix is one of the following 30 row vectors, or the vector of the first column of the 15-order Toeplitz matrix is one of the following 30 column vectors when the 15-order Toeplitz matrix is a circulant matrix. The 30 row vectors are as follows:

[1, 1, 1, −1, 1, 1, −1, −1, 1, −1, 1, −1, −1, −1, −1];
[−1, 1, 1, 1, −1, 1, 1, −1, −1, 1, −1, 1, −1, −1, −1];
[−1, −1, 1, 1, 1, −1, 1, 1, −1, −1, 1, −1, 1, −1, −1];
[−1, −1, −1, 1, 1, 1, −1, 1, 1, −1, −1, 1, −1, 1, −1];
[−1, −1, −1, −1, 1, 1, 1, −1, 1, 1, −1, −1, 1, −1, 1];
[1, −1, −1, −1, −1, 1, 1, 1, −1, 1, 1, −1, −1, 1, −1];
[−1, 1, −1, −1, −1, −1, 1, 1, 1, −1, 1, 1, −1, −1, 1];
[1, −1, 1, −1, −1, −1, −1, 1, 1, 1, −1, 1, 1, −1, −1];
[−1, 1, −1, 1, −1, −1, −1, −1, 1, 1, 1, −1, 1, 1, −1];
[−1, −1, 1, −1, 1, −1, −1, −1, −1, 1, 1, 1, −1, 1, 1];
[1, −1, −1, 1, −1, 1, −1, −1, −1, −1, 1, 1, 1, −1, 1];
[1, 1, −1, −1, 1, −1, 1, −1, −1, −1, −1, 1, 1, 1, −1];
[−1, 1, 1, −1, −1, 1, −1, 1, −1, −1, −1, −1, 1, 1, 1];
[1, −1, 1, 1, −1, −1, 1, −1, 1, −1, −1, −1, −1, 1, 1];
[1, 1, −1, 1, 1, −1, −1, 1, −1, 1, −1, −1, −1, −1, 1];
[1, 1, 1, −1, −1, −1, −1, 1, −1, 1, −1, −1, 1, 1, −1];
[−1, 1, 1, 1, −1, −1, −1, −1, 1, −1, 1, −1, −1, 1, 1];
[1, −1, 1, 1, 1, −1, −1, −1, −1, 1, −1, 1, −1, −1, 1];
[1, 1, −1, 1, 1, 1, −1, −1, −1, −1, 1, −1, 1, −1, −1];
[−1, 1, 1, −1, 1, 1, 1, −1, −1, −1, −1, 1, −1, 1, −1];
[−1, −1, 1, 1, −1, 1, 1, 1, −1, −1, −1, −1, 1, −1, 1];
[1, −1, −1, 1, 1, −1, 1, 1, 1, −1, −1, −1, −1, 1, −1];
[−1, 1, −1, −1, 1, 1, −1, 1, 1, 1, −1, −1, −1, −1, 1];
[1, −1, 1, −1, −1, 1, 1, −1, 1, 1, 1, −1, −1, −1, −1];
[−1, 1, −1, 1, −1, −1, 1, 1, −1, 1, 1, 1, −1, −1, −1];
[−1, −1, 1, −1, 1, −1, −1, 1, 1, −1, 1, 1, 1, −1, −1];
[−1, −1, −1, 1, −1, 1, −1, −1, 1, 1, −1, 1, 1, 1, −1];
[−1, −1, −1, −1, 1, −1, 1, −1, −1, 1, 1, −1, 1, 1, 1];
[1, −1, −1, −1, −1, 1, −1, 1, −1, −1, 1, 1, −1, 1, 1]; and
[1, 1, −1, −1, −1, −1, 1, −1, 1, −1, −1, 1, 1, −1, 1].

The 30 column vectors are as follows:

[1, −1, −1, −1, −1, 1, −1, 1, −1, −1, 1, 1, −1, 1, 1]$^T$;
[1, 1, −1, −1, −1, −1, 1, −1, 1, −1, −1, 1, 1, −1, 1]$^T$;
[1, 1, 1, −1, −1, −1, −1, 1, −1, 1, −1, −1, 1, 1, −1]$^T$;
[−1, 1, 1, 1, −1, −1, −1, −1, 1, −1, 1, −1, −1, 1, 1]$^T$;
[1, −1, 1, 1, 1, −1, −1, −1, −1, 1, −1, 1, −1, −1, 1]$^T$;
[1, 1, −1, 1, 1, 1, −1, −1, −1, −1, 1, −1, 1, −1, −1]$^T$;
[−1, 1, 1, −1, 1, 1, 1, −1, −1, −1, −1, 1, −1, 1, −1]$^T$;
[−1, −1, 1, 1, −1, 1, 1, 1, −1, −1, −1, −1, 1, −1, 1]$^T$;
[1, −1, −1, 1, 1, −1, 1, 1, 1, −1, −1, −1, −1, 1, −1]$^T$;
[−1, 1, −1, −1, 1, 1, −1, 1, 1, 1, −1, −1, −1, −1, 1]$^T$;
[1, −1, 1, −1, −1, 1, 1, −1, 1, 1, 1, −1, −1, −1, −1]$^T$;
[−1, 1, −1, 1, −1, −1, 1, 1, −1, 1, 1, 1, −1, −1, −1]$^T$;
[−1, −1, 1, −1, 1, −1, −1, 1, 1, −1, 1, 1, 1, −1, −1]$^T$;
[−1, −1, −1, 1, −1, 1, −1, −1, 1, 1, −1, 1, 1, 1, −1]$^T$;
[−1, −1, −1, 1, −1, 1, −1, −1, 1, 1, −1, 1, 1, 1, −1]$^T$;

$[-1, -1, -1, -1, 1, -1, 1, -1, -1, 1, 1, -1, 1, 1, 1]^T$;
$[1, -1, 1, 1, -1, -1, 1, -1, 1, -1, -1, -1, -1, 1, 1]^T$;
$[1, 1, -1, 1, 1, -1, -1, 1, -1, 1, -1, -1, -1, -1, 1]^T$;
$[1, 1, 1, -1, 1, 1, -1, -1, 1, -1, 1, -1, -1, -1, -1]^T$;
$[-1, 1, 1, 1, -1, 1, 1, -1, -1, 1, -1, 1, -1, -1, -1]^T$;
$[-1, -1, 1, 1, 1, -1, 1, 1, -1, -1, 1, -1, 1, -1, -1]^T$;
$[-1, -1, -1, 1, 1, 1, -1, 1, 1, -1, -1, 1, -1, 1, -1]^T$;
$[-1, -1, -1, -1, 1, 1, 1, -1, 1, 1, -1, -1, 1, -1, 1]^T$;
$[1, -1, -1, -1, -1, 1, 1, 1, -1, 1, 1, -1, -1, 1, -1]^T$;
$[-1, 1, -1, -1, -1, -1, 1, 1, 1, -1, 1, 1, -1, -1, 1]^T$;
$[1, -1, 1, -1, -1, -1, -1, 1, 1, 1, -1, 1, 1, -1, -1]^T$;
$[-1, 1, -1, 1, -1, -1, -1, -1, 1, 1, 1, -1, 1, 1, -1]^T$;
$[-1, -1, 1, -1, 1, -1, -1, -1, -1, 1, 1, 1, -1, 1, 1]^T$;
$[1, -1, -1, 1, -1, 1, -1, -1, -1, -1, 1, 1, 1, -1, 1]^T$;
$[1, 1, -1, -1, 1, -1, 1, -1, -1, -1, -1, 1, 1, 1, -1]^T$; and
$[-1, 1, 1, -1, -1, 1, -1, 1, -1, -1, -1, -1, 1, 1, 1]^T$.

When the elements in the first row and the elements in the first column of the 16-order P1 matrix are all 1, the 15-order Toeplitz matrix is a circulant matrix, and the vector of the first row of the 15-order Toeplitz matrix is one of the foregoing 30 row vectors, the 16-order P1 matrix is an orthogonal matrix. In this way, the 12-order P matrix obtained through multiplying at least one column of the 12-order P1 matrix by −1 is also an orthogonal matrix.

For example, when n is 16, the 15-order Toeplitz matrix is a circulant matrix, the vector of the first row of the 15-order Toeplitz matrix is the first row vector $e[1, 1, 1, -1, 1, 1, -1, -1, 1, -1, 1, -1, -1, -1, -1]$ in the foregoing 30 row vectors; the vector of the second row of the 15-order Toeplitz matrix is a vector $[-1, 1, 1, 1, -1, 1, 1, -1, -1, 1, -1, 1, -1, -1, -1]$ obtained through performing a rightward 1-bit cyclic shift on the vector e; the vector of the third row of the 15-order Toeplitz matrix is a vector $[-1, -1, 1, 1, 1, -1, 1, 1, -1, -1, 1, -1, 1, -1, -1]$ obtained through performing a rightward 2-bit cyclic shift on the vector e; ...; the vector of the $K^{th}$ row of the 15-order Toeplitz matrix is a vector obtained through performing a rightward (K−1)-bit cyclic shift on the vector e; ...; and the vector of the fifteenth row of the 15-order Toeplitz matrix is a vector $[1, 1, -1, 1, 1, -1, -1, 1, -1, 1, -1, -1, -1, -1, 1]$ obtained through performing a rightward 14-bit cyclic shift on the vector e. In this case, the 16-order P1 matrix corresponding to the vector e may be:

$$\begin{bmatrix}
1 & 1 & 1 & 1 & 1 & 1 & 1 & 1 & 1 & 1 & 1 & 1 & 1 & 1 & 1 & 1 \\
1 & 1 & 1 & 1 & -1 & 1 & 1 & -1 & -1 & 1 & -1 & 1 & -1 & -1 & -1 & -1 \\
1 & -1 & 1 & 1 & 1 & -1 & 1 & 1 & -1 & -1 & 1 & -1 & 1 & -1 & -1 & -1 \\
1 & -1 & -1 & 1 & 1 & 1 & -1 & 1 & 1 & -1 & -1 & 1 & -1 & 1 & -1 & -1 \\
1 & -1 & -1 & -1 & 1 & 1 & 1 & -1 & 1 & 1 & -1 & -1 & 1 & -1 & 1 & -1 \\
1 & -1 & -1 & -1 & -1 & 1 & 1 & 1 & -1 & 1 & 1 & -1 & -1 & 1 & -1 & 1 \\
1 & 1 & -1 & -1 & -1 & -1 & 1 & 1 & 1 & -1 & 1 & 1 & -1 & -1 & 1 & -1 \\
1 & -1 & 1 & -1 & -1 & -1 & -1 & 1 & 1 & 1 & -1 & 1 & 1 & -1 & -1 & 1 \\
1 & 1 & -1 & 1 & -1 & -1 & -1 & -1 & 1 & 1 & 1 & -1 & 1 & 1 & -1 & -1 \\
1 & -1 & 1 & -1 & 1 & -1 & -1 & -1 & -1 & 1 & 1 & 1 & -1 & 1 & 1 & -1 \\
1 & -1 & -1 & 1 & -1 & 1 & -1 & -1 & -1 & -1 & 1 & 1 & 1 & -1 & 1 & 1 \\
1 & 1 & -1 & -1 & 1 & -1 & 1 & -1 & -1 & -1 & -1 & 1 & 1 & 1 & -1 & 1 \\
1 & 1 & 1 & -1 & -1 & 1 & -1 & 1 & -1 & -1 & -1 & -1 & 1 & 1 & 1 & -1 \\
1 & -1 & 1 & 1 & -1 & -1 & 1 & -1 & 1 & -1 & -1 & -1 & -1 & 1 & 1 & 1 \\
1 & 1 & -1 & 1 & 1 & -1 & -1 & 1 & -1 & 1 & -1 & -1 & -1 & -1 & 1 & 1 \\
1 & 1 & 1 & -1 & 1 & 1 & -1 & -1 & 1 & -1 & 1 & -1 & -1 & -1 & -1 & 1
\end{bmatrix}$$

In this way, the sending apparatus or the receiving apparatus may obtain the 16-order P1 matrix based on the vector e, to obtain the 16-order P matrix based on the P1.

The vector of the first column of the 15-order Toeplitz matrix is the first row vector $\bar{e}=[1, -1, -1, -1, -1, 1, -1, 1, -1, -1, 1, 1, -1, 1, 1]^T$ in the foregoing 30 column vectors; the vector of the second column of the 15-order Toeplitz matrix is a vector $[1, 1, -1, 1, 1, -1, -1, 1, -1, 1, -1, -1, -1, -1, 1]^T$ obtained through performing a rightward 1-bit cyclic shift on $\bar{e}$; the vector of the third column of the 15-order Toeplitz matrix is a vector $[1, 1, 1, -1, 1, 1, -1, -1, 1, -1, 1, -1, -1, -1, -1]^T$ obtained through performing a rightward 2-bit cyclic shift on e; ...; the vector of the $K^{th}$ column of the 15-order Toeplitz matrix is a vector obtained through performing a rightward (K−1)-bit cyclic shift on $\hat{e}$; ...; and the vector of the fifteenth column of the 15-order Toeplitz matrix is a vector $[-1, 1, 1, -1, -1, 1, -1, 1, -1, -1, -1, -1, 1, 1, 1]^T$ obtained through performing a rightward 14-bit cyclic shift on $\bar{e}$.

In this way, when the vector $\bar{e}$ is the vector of the first column of the 15-order Toeplitz matrix, the 16-order P1 matrix formed is the same as the 16-order P1 matrix formed when the vector e is the vector of the first row of the 15-order Toeplitz matrix. In other words, the 16-order P1 matrix constructed based on the first row vector in the 30 row vectors is the same as the P1 matrix constructed based on the first column vector in the 30 column vectors.

Similarly, in some embodiments, the 16-order P1 matrix constructed based on the $K^{th}$ row vector in the 30 row vectors is the same as the 16-order P1 matrix constructed based on the $K^{th}$ column vector in the 30 column vectors. Each of the 30 row vectors can be used to construct a P1 matrix, and each of the 30 column vectors can be used to construct a P1 matrix. The 30 row vectors and the 30 column vectors can be used to construct 30 different 16-order P1 matrices in total.

For another example, the vector of the first row of the 15-order Toeplitz matrix is $f=[1, 1, 1, -1, -1, -1, -1, 1, -1, 1, -1, -1, 1, 1, -1]$, and/or the vector of the first column of the 15-order Toeplitz matrix is $\bar{f}=[1, -1, 1, 1, -1, -1, 1, -1, 1, -1, -1, -1, -1, 1, 1]$. In a manner similar to obtaining the 16-order P1 matrix constructed based on the vector e or e, the sending apparatus may also obtain another 16-order P1 matrix based on the column vector f and/or $\bar{f}$.

$$\begin{bmatrix}
1 & 1 & 1 & 1 & 1 & 1 & 1 & 1 & 1 & 1 & 1 & 1 & 1 & 1 & 1 & 1 \\
1 & 1 & 1 & 1 & -1 & -1 & -1 & -1 & 1 & -1 & 1 & -1 & -1 & 1 & 1 & -1 \\
1 & -1 & 1 & 1 & 1 & -1 & -1 & -1 & -1 & 1 & -1 & 1 & -1 & -1 & 1 & 1 \\
1 & 1 & -1 & 1 & 1 & 1 & -1 & -1 & -1 & -1 & 1 & -1 & 1 & -1 & -1 & 1 \\
1 & 1 & 1 & -1 & 1 & 1 & 1 & -1 & -1 & -1 & -1 & 1 & -1 & 1 & -1 & -1 \\
1 & -1 & 1 & 1 & -1 & 1 & 1 & 1 & -1 & -1 & -1 & -1 & 1 & -1 & 1 & -1 \\
1 & -1 & -1 & 1 & 1 & -1 & 1 & 1 & 1 & -1 & -1 & -1 & -1 & 1 & -1 & 1 \\
1 & 1 & -1 & -1 & 1 & 1 & -1 & 1 & 1 & 1 & -1 & -1 & -1 & -1 & 1 & -1 \\
1 & -1 & 1 & -1 & -1 & 1 & 1 & -1 & 1 & 1 & 1 & -1 & -1 & -1 & -1 & 1 \\
1 & 1 & -1 & 1 & -1 & -1 & 1 & 1 & -1 & 1 & 1 & 1 & -1 & -1 & -1 & -1 \\
1 & -1 & 1 & -1 & 1 & -1 & -1 & 1 & 1 & -1 & 1 & 1 & 1 & -1 & -1 & -1 \\
1 & -1 & -1 & 1 & -1 & 1 & -1 & -1 & 1 & 1 & -1 & 1 & 1 & 1 & -1 & -1 \\
1 & -1 & -1 & -1 & 1 & -1 & 1 & -1 & -1 & 1 & 1 & -1 & 1 & 1 & 1 & -1 \\
1 & -1 & -1 & -1 & -1 & 1 & -1 & 1 & -1 & -1 & 1 & 1 & -1 & 1 & 1 & 1 \\
1 & 1 & -1 & -1 & -1 & -1 & 1 & -1 & 1 & -1 & -1 & 1 & 1 & -1 & 1 & 1 \\
1 & 1 & 1 & -1 & -1 & -1 & -1 & 1 & -1 & 1 & -1 & -1 & 1 & 1 & -1 & 1
\end{bmatrix}$$

In a manner similar to obtaining the 16-order P1 matrix constructed based on the vector e or $\bar{e}$, the sending apparatus may also obtain a 16-order P1 matrix based on any one of the 30 row vectors or any one of the 30 column vectors, to obtain a P matrix. 16-order P1 matrices obtained based on each row vector or each column vector are not enumerated herein.

This embodiment of this application is not limited to that the elements in the first row and the elements in the first column of the 16-order P1 matrix are all 1, and is not limited to that the vector of the first row of the 11-order Toeplitz matrix is definitely the 30 vectors in the foregoing example.

Another vector of the first row of the 15-order Toeplitz matrix that can ensure an orthogonal 16-order P1 matrix and a matrix type being any one of the foregoing types of the 15-order Toeplitz matrix types is also an implementation of the technical solution in some embodiments.

Optionally, for example, the elements in the first row of the 16-order P1 matrix may include a combination of one or more elements whose values are 1 and one or more elements whose values are −1. In this case, the 16-order P matrix may also be the same as the 16-order P1 matrix.

In some other embodiments of this application, when n is 10, the 10-order P matrix may be obtained through multiplying at least one column of a 10-order P2 matrix by −1. For example, the 10-order P matrix is obtained through multiplying columns 2, 6, and 10 of the 10-order P2 matrix by −1. Elements in the first row and the first column of the P2 matrix are all 1, the P2 matrix includes a 9-order block matrix in the lower right corner, and the block matrix is a 9-order symmetric matrix. Elements on a diagonal of the 9-order symmetric matrix are all −1, and any off-diagonal element is j or −j. In this way, the sending apparatus and the receiving apparatus may store only 36 elements on one diagonal side of the 9-order symmetric matrix, without storing the complete P matrix, effectively saving storage space of the sending apparatus and the receiving apparatus. In addition, a value of each element in the P matrix is simple, facilitating calculation of a product of the element in the P matrix and the EHT-LTF sequence. Certainly, from a perspective of solution implementation, the sending apparatus and the receiving apparatus may alternatively store the complete 10-order P2 matrix, or store the complete 10-order P matrix.

For example, the P2 matrix may be:

$$P2_{10 \times 10} = \begin{bmatrix} 1 & 1 & 1 & 1 & 1 & 1 & 1 & 1 & 1 & -1 \\ 1 & -1 & -j & -j & -j & -j & j & j & j & j \\ 1 & -j & -1 & j & j & -j & -j & -j & j & j \\ 1 & -j & j & -1 & -j & j & -j & j & -j & j \\ 1 & -j & j & -j & -1 & j & j & -j & j & -j \\ 1 & -j & -j & j & j & -1 & j & j & -j & -j \\ 1 & j & -j & -j & j & j & -1 & -j & -j & j \\ 1 & j & -j & j & j & -j & -1 & j & -j \\ 1 & j & j & -j & j & -j & -j & j & -1 & -j \\ 1 & j & j & j & -j & -j & j & -j & -j & -j \end{bmatrix}$$

It should be understood that the P2 matrix in this embodiment of this application is not limited to this example, and another 10-order matrix that meets the following condition is also an implementation of the technical solution in some embodiments. The following condition are: Elements in the first row and the first column of the matrix are all 1, the matrix includes a 9-order block matrix in the lower right corner, and the block matrix is a 9-order symmetric matrix. Elements on a diagonal of the 9-order symmetric matrix are all −1, and any off-diagonal element is j or −j.

Optionally, the 9-order block matrix includes four elements whose values are j and four elements whose values are −j in each row; and/or the 9-order block matrix includes four elements whose values are j and four elements whose values are −j in each column.

Optionally, the 10-order P matrix may be obtained through multiplying both at least one column and at least one row of the 10-order P2 matrix by −1. A sequence number of a column multiplied by −1 is the same as a sequence number of a row multiplied by −1. In this way, it can be ensured that the P matrix is a symmetric matrix. For example, the 10-order P matrix is obtained through multiplying rows 2, 6, and 10 of the 10-order P2 matrix by −1 and multiplying columns 2, 6, and 10 by −1.

In some other embodiments of this application, when n is greater than 8, a 4-order block matrix in the upper left corner of the P matrix is the same as a P matrix used for multiplying the EHT-LTF sequence when $N_{SS}$=3 or 4 and $N_{SS}$=4.

When $N_{SS}$=3 or 4, and $N_{LTF}$=4, the P matrix used for multiplying the EHT-LTF sequence is:

$$P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In this way, when $N_{SS}$ is greater than 8 and n is greater than 8, first four EHT-LTF sequences of the first stream are respectively multiplied by 1, −1, 1, 1; first four EHT-LTF sequences of the second stream are respectively multiplied by 1, 1, −1, 1; first four EHT-LTF sequences of the third stream are respectively multiplied by 1, 1, 1, −1; and first four EHT-LTF sequences of the fourth stream are respectively multiplied by −1, 1, 1, 1.

When $N_{SS}$=4, four EHT-LTF sequences of the first stream are respectively multiplied by 1, −1, 1, 1; four EHT-LTF sequences of the second stream are respectively multiplied by 1, 1, −1, 1; four EHT-LTF sequences of the third stream are respectively multiplied by 1, 1, 1, −1; and four EHT-LTF sequences of the fourth stream are respectively multiplied by −1, 1, 1, 1.

It can be learned that when $N_{SS}$ is greater than 8 and n is greater than 8, values of elements in the P matrix multiplied by the first four EHT-LTF sequences of the first to fourth streams are the same as values of elements in the P matrix multiplied by the four EHT-LTF sequences of the first to fourth streams when $N_{SS}$=4. In this way, a calculation process in which the sending apparatus calculates the P matrix by multiplying the EHT-LTF sequence can be simplified.

Optionally, when $N_{SS}$=7 or 8, and $N_{LTF}$=8, the P matrix used for multiplying the EHT-LTF sequence is:

$$P_{8 \times 8} = \begin{bmatrix} P_{4 \times 4} & P_{4 \times 4} \\ P_{4 \times 4} & -P_{4 \times 4} \end{bmatrix}.$$

When n is 12, the P matrix is $$P_{12 \times 12} = \begin{bmatrix} A_{4 \times 4} & A_{4 \times 4} & B_{4 \times 4} \\ A_{4 \times 4} & C_{4 \times 4} & D_{4 \times 4} \\ E_{4 \times 4} & F_{4 \times 4} & G_{4 \times 4} \end{bmatrix},$$

where $A_{4 \times 4}$, $B_{4 \times 4}$, $C_{4 \times 4}$, $D_{4 \times 4}$, $E_{4 \times 4}$, $F_{4 \times 4}$, $G_{4 \times 4}$ are block matrices of $P_{12 \times 12}$.

$$A_{4 \times 4} = P_{4 \times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix}.$$

In this way, elements in the P matrix used for multiplying the EHT-LTF sequences corresponding to the first four streams when $N_{SS}$ is greater than 8 and n is greater than 8 are partially same as elements in the P matrix used for multiplying the EHT-LTF sequences when $N_{SS}$=4 and n=4. Elements in the P matrix used for multiplying the EHT-LTF sequences corresponding to the first eight streams when $N_{SS}$ is greater than 8 and n is greater than 8 are partially same as elements in the P matrix used for multiplying the EHT-LTF sequences corresponding to eight streams when $N_{SS}$=8 and n=8.

Elements in the P matrix used for multiplying the first to eighth EHT-LTF sequences corresponding to the first four streams when $N_{SS}$ is greater than 8 and n is greater than 8 are the same as elements in the P matrix used for multiplying the first to eighth EHT-LTF sequences corresponding to the first four streams when $N_{SS}$=8 and n=8. Elements in the P matrix used for multiplying the first to fourth EHT-LTF sequences corresponding to the fifth to eighth streams when $N_{SS}$ is greater than 8 and n is greater than 8 are the same as elements in the P matrix used for multiplying the first to fourth EHT-LTF sequences corresponding to the four streams when $N_{SS}$=4 and n=4, and the same as elements in the P matrix used for multiplying the first to fourth EHT-LTF sequences corresponding to the fifth to eighth streams when $N_{SS}$=8 and n=8.

In this way, a calculation process in which the sending apparatus calculates the P matrix by multiplying the EHT-LTF sequence can be simplified.

When specific elements of $C_{4\times4}$, $D_{4\times4}$, $E_{4\times4}$, $F_{4\times4}$, and $G_{4\times4}$ are determined, specific elements of $C_{4\times4}$, $D_{4\times4}$, $E_{4\times4}$, $F_{4\times4}$, and $G_{4\times4}$ may be obtained when the condition for an orthogonal matrix $$P_{12\times12} = \begin{bmatrix} A_{4\times4} & A_{4\times4} & B_{4\times4} \\ A_{4\times4} & C_{4\times4} & D_{4\times4} \\ E_{4\times4} & F_{4\times4} & G_{4\times4} \end{bmatrix}$$

is met and values of all elements are only 1 and −1.

The P matrix may be:

$$P_{12\times12} = \begin{bmatrix} 1 & -1 & 1 & 1 & 1 & -1 & 1 & 1 & 1 & -1 & 1 & 1 \\ 1 & 1 & -1 & 1 & 1 & 1 & -1 & 1 & 1 & 1 & -1 & 1 \\ 1 & 1 & 1 & -1 & 1 & 1 & 1 & -1 & 1 & 1 & 1 & -1 \\ -1 & 1 & 1 & 1 & -1 & 1 & 1 & 1 & -1 & -1 & -1 & -1 \\ 1 & -1 & 1 & 1 & 1 & 1 & -1 & -1 & -1 & -1 & -1 & -1 \\ 1 & 1 & -1 & 1 & -1 & 1 & 1 & -1 & -1 & -1 & 1 & 1 \\ 1 & 1 & 1 & -1 & -1 & -1 & -1 & -1 & 1 & -1 & -1 & 1 \\ -1 & 1 & 1 & 1 & -1 & 1 & -1 & -1 & 1 & -1 & 1 & 1 \\ 1 & 1 & -1 & -1 & 1 & -1 & 1 & 1 & -1 & -1 & -1 & -1 \\ 1 & -1 & 1 & -1 & -1 & 1 & 1 & 1 & -1 & 1 & -1 & -1 \\ 1 & 1 & 1 & 1 & -1 & -1 & -1 & 1 & -1 & 1 & 1 & 1 \\ 1 & -1 & -1 & 1 & -1 & -1 & 1 & -1 & 1 & 1 & -1 & -1 \end{bmatrix}$$

Values of elements in the 12×12 P matrix are only 1 and −1. The value of the element in the P matrix is simple, so that a calculation process of multiplying the P matrix by the EHT-LTF sequence by the sending apparatus can be simpler.

It should be understood that an order of the P matrix is the same as a quantity of LTF symbols sent on each stream. A higher order of the P matrix indicates a larger quantity of LTF symbols in the PPDU.

It can be learned from the foregoing embodiments that a 12-order P matrix, a 14-order P matrix, and a 10-order P matrix are separately provided in this application. When generating an LTF of a PPDU, the sending apparatus may determine, based on $N_{SS}$, a smallest P matrix with an order greater than $N_{SS}$. This helps avoid an overhead waste caused by a large difference between an order of a P matrix and $N_{SS}$. In other words, embodiments of this application help reduce channel estimation overheads.

Figure 9:
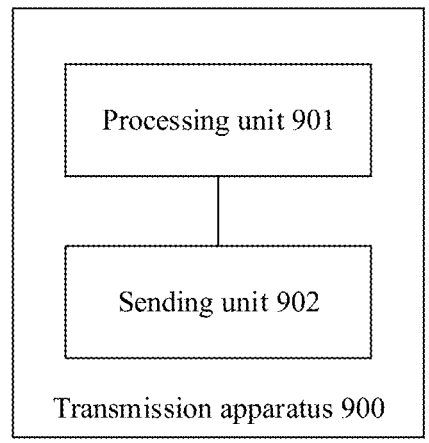
FIG. 9 is a schematic diagram depicting a structure of a transmission apparatus according to an embodiment of this application.

Refer to FIG. 9. FIG. 9 is a schematic diagram depicting a structure of a transmission apparatus according to an embodiment of this application. The transmission apparatus includes a processing unit (e.g., processing circuit) 901 and a sending unit (e.g., sending circuit) 902. The transmission apparatus 900 may be a PPDU sending apparatus. The transmission apparatus 900 may be a station or an access point.

The processing unit 901 is configured to generate a PPDU, where the PPDU includes an EHT-LTF, the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1.

The sending unit 902 is configured to send the PPDU.

Figure 10:
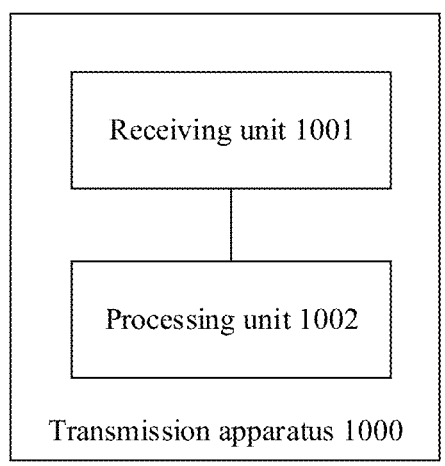
FIG. 10 is a schematic diagram of a transmission apparatus according to another embodiment of this application.

Refer to FIG. 10. FIG. 10 is a schematic diagram depicting a structure of another transmission apparatus according to an embodiment of this application. The transmission apparatus includes a receiving unit (e.g., receiving circuit) 1001 and a processing unit (e.g., processing circuit) 1002. The transmission apparatus 1000 may be a PPDU sending apparatus. The transmission apparatus 1000 may be a station or an access point.

The receiving unit 1001 is configured to receive a PPDU, where the PPDU includes an EHT-LTF, the EHT-LTF is obtained based on a P matrix and a predefined EHT-LTF sequence, the P matrix is an n×n orthogonal matrix, n is greater than 8, and a first row of the P matrix includes at least one element whose value is 1 and at least one element whose value is −1.

The processing unit 1002 is configured to perform channel estimation based on the EHT-LTF field of the PPDU.

An order of the P matrix in the technical solution in this application is greater than 8. When there are more than eight spatial streams, channel estimation can be performed on a channel with multiple spatial streams greater than eight streams, so that the sending apparatus can transmit data on more than eight streams, improving data transmission efficiency. In addition, the first row of the P matrix includes an element whose value is 1 and an element whose value is −1. This can also avoid a spectrum protrusion (e.g., spectral lines) of a pilot subcarrier caused because values of elements in the first row of the P matrix are all 1.

It should be understood that the foregoing supplementary descriptions and technical effects of the steps in the PPDU transmission method are also applicable to the embodiments of the transmission apparatuses in this application. Details are not described herein again.

This application further provides a computer-readable storage medium. The computer-readable storage medium stores a computer program. When the computer-readable storage medium is executed by a computer, a function of any one of the foregoing method embodiments is implemented.

This application further provides a computer program product. When the computer program product is executed by a computer, a function of any one of the foregoing method embodiments is implemented.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with units and algorithm steps in the examples described in embodiments disclosed in this specification, this application can be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this application.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. A part or all of the units may be selected according to actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a universal serial bus (USB) flash drive, a removable hard disk, a ROM, a RAM, a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A physical layer protocol data unit (PPDU) transmission method, comprising:
generating a PPDU, wherein the PPDU comprises an extremely high throughput-long training field (EHT-LTF), the EHT-LTF is obtained based on a P matrix and a predefined EHT-LTF sequence, the P matrix is an n×n orthogonal matrix, n is an integer greater than 8, and a first row of the P matrix comprises at least one element whose value is 1 and at least one element whose value is −1; and
sending the PPDU;
wherein the P matrix is obtained through multiplying at least one column of an n-order P1 matrix by −1, and the P1 matrix comprises a block matrix that is an (n−1)-order Toeplitz matrix.

2. The method according to claim 1, wherein a value of any element in the P matrix is 1, −1, j, or −j, and j is an imaginary unit.

3. The method according to claim 1, wherein the (n−1)-order Toeplitz matrix satisfies at least one of the following:
$a(x,y)=-a(y,x)$ in the (n−1)-order Toeplitz matrix, wherein $a(x,y)$ is an element in an $x^{th}$ row and a $y^{th}$ column in the (n−1)-order Toeplitz matrix, $a(y,x)$ is an element in a $y^{th}$ row and an $x^{th}$ column in the (n−1)-order Toeplitz matrix, and $x \neq y$; or
the (n−1)-order Toeplitz matrix is a circulant matrix.

4. The method according to claim 1, wherein the P matrix is obtained through multiplying a $(4m+2)^{th}$ column of the n-order P1 matrix by −1, and m is an integer with $0 \leq m \leq (n-2)/4$.

5. The method according to claim 1, wherein n is 12, the (n−1)-order Toeplitz matrix is a circulant matrix, and wherein
a first row of the (n−1)-order Toeplitz matrix is one of a vector α=[1, −1, 1, 1, 1, −1, −1, −1, 1, −1, −1], b=[1, 1, −1, 1, −1, −1, 1, −1, −1, −1, 1], a vector obtained after a cyclic shift of α, or a vector obtained after a cyclic shift of b; or the first row of the (n−1)-order Toeplitz matrix is one of a vector $\bar{a}=[1, -1, -1, 1, -1, -1, -1, 1, 1, 1, -1]^T$, a vector $\bar{b}=[-1, 1, -1, -1, 1, -1, 1, 1, 1, -1, -1]^T$, a vector obtained after a cyclic shift of $\bar{a}$, or a vector obtained after a cyclic shift of $\bar{b}$.

6. The method according to claim 1, wherein n=12, and the n-order P1 matrix is:

$$\begin{bmatrix} 1 & 1 & 1 & 1 & 1 & 1 & 1 & 1 & 1 & 1 & 1 & 1 \\ 1 & 1 & -1 & 1 & 1 & 1 & -1 & -1 & -1 & 1 & -1 & -1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \end{bmatrix}, \text{ or}$$

$$\begin{bmatrix} 1 & 1 & 1 & 1 & 1 & 1 & 1 & 1 & 1 & 1 & 1 & 1 \\ 1 & 1 & 1 & -1 & 1 & -1 & -1 & 1 & -1 & -1 & -1 & 1 \\ 1 & 1 & 1 & 1 & -1 & 1 & -1 & -1 & 1 & -1 & -1 & -1 \\ 1 & -1 & 1 & 1 & 1 & -1 & 1 & -1 & -1 & 1 & -1 & -1 \\ 1 & -1 & -1 & 1 & 1 & 1 & -1 & 1 & -1 & -1 & 1 & -1 \\ 1 & -1 & -1 & -1 & 1 & 1 & 1 & -1 & 1 & -1 & -1 & 1 \\ 1 & 1 & -1 & -1 & -1 & 1 & 1 & 1 & -1 & 1 & -1 & -1 \\ 1 & -1 & 1 & -1 & -1 & -1 & 1 & 1 & 1 & -1 & 1 & -1 \\ 1 & -1 & 1 & 1 & -1 & -1 & -1 & 1 & 1 & 1 & -1 & 1 \\ 1 & 1 & -1 & 1 & -1 & -1 & -1 & 1 & 1 & 1 & -1 & 1 \\ 1 & 1 & 1 & -1 & 1 & -1 & -1 & -1 & 1 & 1 & 1 & -1 \\ 1 & 1 & -1 & 1 & -1 & 1 & -1 & -1 & -1 & -1 & 1 & 1 \end{bmatrix}.$$

7. The method according to claim 1, wherein n is 12, $a(x,y)=-a(y,x)$ in the (n−1)-order Toeplitz matrix, wherein $a(x,y)$ is the element in the $x^{th}$ row and the $y^{th}$ column in the (n−1)-order Toeplitz matrix, $a(y,x)$ is the element in the $y^{th}$ row and the $x^{th}$ column in the (n−1)-order Toeplitz matrix, and $x \neq y$; and the n-order P1 matrix is:

$$\begin{bmatrix} 1 & 1 & 1 & 1 & 1 & 1 & 1 & 1 & 1 & 1 & 1 & 1 \\ -1 & 1 & -1 & 1 & -1 & -1 & -1 & 1 & 1 & 1 & -1 & 1 \\ -1 & 1 & 1 & -1 & 1 & -1 & -1 & -1 & 1 & 1 & 1 & -1 \\ -1 & -1 & 1 & 1 & -1 & 1 & -1 & -1 & -1 & 1 & 1 & 1 \\ -1 & 1 & -1 & 1 & 1 & -1 & 1 & -1 & -1 & -1 & 1 & 1 \\ -1 & 1 & 1 & -1 & 1 & 1 & -1 & 1 & -1 & -1 & -1 & 1 \\ -1 & 1 & 1 & 1 & -1 & 1 & 1 & -1 & 1 & -1 & -1 & -1 \\ -1 & -1 & 1 & 1 & 1 & -1 & 1 & 1 & -1 & 1 & -1 & -1 \\ -1 & -1 & -1 & 1 & 1 & 1 & -1 & 1 & 1 & -1 & 1 & -1 \\ -1 & -1 & -1 & -1 & 1 & 1 & 1 & -1 & 1 & 1 & -1 & 1 \\ -1 & 1 & -1 & -1 & -1 & 1 & 1 & 1 & -1 & 1 & 1 & -1 \\ -1 & -1 & 1 & -1 & -1 & -1 & 1 & 1 & 1 & -1 & 1 & 1 \end{bmatrix}, \text{ or}$$

$$\begin{bmatrix} 1 & 1 & 1 & 1 & 1 & 1 & 1 & 1 & 1 & 1 & 1 & 1 \\ -1 & 1 & 1 & -1 & 1 & 1 & 1 & -1 & -1 & -1 & 1 & -1 \\ -1 & -1 & 1 & 1 & -1 & 1 & 1 & 1 & -1 & -1 & -1 & 1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & 1 & -1 & 1 & 1 & -1 & 1 & 1 & 1 & -1 \\ -1 & 1 & -1 & -1 & 1 & -1 & 1 & 1 & -1 & 1 & 1 & 1 \\ -1 & -1 & -1 & -1 & 1 & -1 & -1 & 1 & 1 & -1 & 1 & 1 \\ -1 & -1 & -1 & -1 & -1 & 1 & -1 & -1 & 1 & 1 & -1 & 1 \\ -1 & 1 & -1 & -1 & -1 & -1 & 1 & -1 & -1 & 1 & 1 & -1 \\ -1 & 1 & 1 & -1 & -1 & -1 & -1 & 1 & -1 & -1 & 1 & 1 \\ -1 & 1 & -1 & 1 & 1 & -1 & -1 & -1 & -1 & 1 & -1 & 1 \end{bmatrix}.$$

8. The method according to claim 1, wherein n is 16, the (n−1)-order Toeplitz matrix is a circulant matrix, and a first row of the (n−1)-order Toeplitz matrix is a vector obtained after a cyclic shift of a vector e=[1, 1, 1, −1, 1, 1, −1, −1, 1, −1, 1, −1, −1, −1, −1], or a vector obtained after a cyclic shift of a vector f=[1, 1, 1, −1, −1, −1, −1, 1, −1, 1, −1, −1, 1, 1, −1]; or the first row of the (n−1)-order Toeplitz matrix is a vector obtained after a cyclic shift of a vector $\bar{e}=[1, -1, -1, -1, -1, 1, -1, 1, -1, -1, 1, 1, -1, 1, 1]^T$, or a vector obtained after a cyclic shift of a vector $\bar{f}=[1, -1, 1, 1, -1, -1, 1, -1, 1, -1, -1, -1, -1, 1, 1]^T$.

9. The method according to claim 1, wherein n is 16, the (n−1)-order Toeplitz matrix is a circulant matrix, and the n-order P1 matrix is:

$$\begin{bmatrix} 1 & 1 & 1 & 1 & 1 & 1 & 1 & 1 & 1 & 1 & 1 & 1 & 1 & 1 & 1 & 1 \\ 1 & 1 & 1 & 1 & -1 & 1 & 1 & -1 & -1 & 1 & -1 & 1 & -1 & -1 & -1 & -1 \\ 1 & -1 & 1 & 1 & 1 & -1 & 1 & 1 & -1 & -1 & 1 & -1 & 1 & -1 & -1 & -1 \\ 1 & -1 & -1 & 1 & 1 & 1 & -1 & 1 & 1 & -1 & -1 & 1 & -1 & 1 & -1 & -1 \\ 1 & -1 & -1 & -1 & 1 & 1 & 1 & -1 & 1 & 1 & -1 & -1 & 1 & -1 & 1 & -1 \\ 1 & -1 & -1 & -1 & -1 & 1 & 1 & 1 & -1 & 1 & 1 & -1 & -1 & 1 & -1 & 1 \\ 1 & 1 & -1 & -1 & -1 & -1 & 1 & 1 & 1 & -1 & 1 & 1 & -1 & -1 & 1 & -1 \\ 1 & -1 & 1 & -1 & -1 & -1 & -1 & 1 & 1 & 1 & -1 & 1 & 1 & -1 & -1 & 1 \\ 1 & 1 & -1 & 1 & -1 & -1 & -1 & -1 & 1 & 1 & 1 & -1 & 1 & 1 & -1 & -1 \\ 1 & -1 & 1 & -1 & 1 & -1 & -1 & -1 & -1 & 1 & 1 & 1 & -1 & 1 & 1 & -1 \\ 1 & -1 & -1 & 1 & -1 & 1 & -1 & -1 & -1 & -1 & 1 & 1 & 1 & -1 & 1 & 1 \\ 1 & 1 & -1 & -1 & 1 & -1 & 1 & -1 & -1 & -1 & -1 & 1 & 1 & 1 & -1 & 1 \\ 1 & 1 & 1 & -1 & -1 & 1 & -1 & 1 & -1 & -1 & -1 & -1 & 1 & 1 & 1 & -1 \\ 1 & -1 & 1 & 1 & -1 & -1 & 1 & -1 & 1 & -1 & -1 & -1 & -1 & 1 & 1 & 1 \\ 1 & 1 & -1 & 1 & 1 & -1 & -1 & 1 & -1 & 1 & -1 & -1 & -1 & -1 & 1 & 1 \\ 1 & 1 & 1 & -1 & 1 & 1 & -1 & -1 & 1 & -1 & 1 & -1 & -1 & -1 & -1 & 1 \end{bmatrix};$$

or $$\begin{bmatrix} 1 & 1 & 1 & 1 & 1 & 1 & 1 & 1 & 1 & 1 & 1 & 1 & 1 & 1 & 1 & 1 \\ 1 & 1 & 1 & -1 & -1 & -1 & -1 & 1 & -1 & 1 & -1 & -1 & 1 & 1 & -1 \\ 1 & -1 & 1 & 1 & 1 & -1 & -1 & -1 & -1 & 1 & -1 & 1 & -1 & -1 & 1 & 1 \\ 1 & 1 & -1 & 1 & 1 & -1 & -1 & -1 & -1 & 1 & -1 & 1 & -1 & -1 & 1 \\ 1 & 1 & 1 & -1 & 1 & 1 & 1 & -1 & -1 & -1 & -1 & 1 & -1 & 1 & -1 & -1 \\ 1 & -1 & 1 & 1 & -1 & 1 & 1 & 1 & -1 & -1 & -1 & -1 & 1 & -1 & 1 & -1 \\ 1 & -1 & -1 & 1 & 1 & -1 & 1 & 1 & 1 & -1 & -1 & -1 & -1 & 1 & -1 & 1 \\ 1 & 1 & -1 & -1 & 1 & 1 & -1 & 1 & 1 & 1 & -1 & -1 & -1 & -1 & 1 & -1 \\ 1 & -1 & 1 & -1 & -1 & 1 & 1 & -1 & 1 & 1 & 1 & -1 & -1 & -1 & -1 & 1 \\ 1 & 1 & -1 & 1 & -1 & -1 & 1 & 1 & -1 & 1 & 1 & 1 & -1 & -1 & -1 & -1 \\ 1 & -1 & 1 & -1 & 1 & -1 & -1 & 1 & 1 & -1 & 1 & 1 & 1 & -1 & -1 & -1 \\ 1 & -1 & -1 & 1 & -1 & 1 & -1 & -1 & 1 & 1 & -1 & 1 & 1 & 1 & -1 & -1 \\ 1 & -1 & -1 & -1 & 1 & -1 & 1 & -1 & -1 & 1 & 1 & -1 & 1 & 1 & 1 & -1 \\ 1 & -1 & -1 & -1 & -1 & 1 & -1 & 1 & -1 & -1 & 1 & 1 & -1 & 1 & 1 & 1 \\ 1 & 1 & -1 & -1 & -1 & -1 & 1 & -1 & 1 & -1 & -1 & 1 & 1 & -1 & 1 & 1 \\ 1 & 1 & 1 & -1 & -1 & -1 & -1 & 1 & -1 & 1 & -1 & -1 & 1 & 1 & -1 & 1 \end{bmatrix}.$$

10. The method according to claim 1, wherein n is 14, the (n−1)-order Toeplitz matrix comprised in the n-order P1 matrix is a circulant matrix, or the (n−1)-order Toeplitz matrix is a circulant matrix and is a symmetric matrix; and the n-order P1 matrix is:

$$\begin{bmatrix} 1 & 1 & 1 & 1 & 1 & 1 & 1 & 1 & 1 & 1 & 1 & 1 & 1 & 1 \\ 1 & -1 & -j & j & -j & -j & j & j & j & j & -j & -j & j & -j \\ 1 & -j & -1 & -j & j & -j & -j & j & j & j & j & -j & -j & j \\ 1 & j & -j & -1 & -j & j & -j & -j & j & j & j & j & -j & -j \\ 1 & -j & j & -j & -1 & -j & j & -j & -j & j & j & j & j & -j \\ 1 & -j & -j & j & -j & -1 & -j & j & -j & -j & j & j & j & j \\ 1 & j & -j & -j & j & -j & -1 & -j & j & -j & -j & j & j & j \\ 1 & j & j & -j & -j & j & -j & -1 & -j & j & -j & -j & j & j \\ 1 & j & j & j & -j & -j & j & -j & -1 & -j & j & -j & -j & j \\ 1 & j & j & j & j & -j & -j & j & -j & -1 & -j & j & -j & -j \\ 1 & -j & j & j & j & j & -j & -j & j & -j & -1 & -j & j & -j \\ 1 & -j & -j & j & j & j & j & -j & -j & j & -j & -1 & -j & j \\ 1 & j & -j & -j & j & j & j & j & -j & -j & j & -j & -1 & -j \\ 1 & -j & j & -j & -j & j & j & j & j & -j & -j & j & -j & -1 \end{bmatrix}, \text{or}$$

$$\begin{bmatrix} 1 & 1 & 1 & 1 & 1 & 1 & 1 & 1 & 1 & 1 & 1 & 1 & 1 & 1 \\ 1 & -1 & j & -j & j & j & -j & -j & -j & -j & j & j & -j & j \\ 1 & j & -1 & j & -j & j & j & -j & -j & -j & -j & j & j & -j \\ 1 & -j & j & -1 & j & -j & j & j & -j & -j & -j & -j & j & j \\ 1 & j & -j & j & -1 & j & -j & j & j & -j & -j & -j & -j & j \\ 1 & j & j & -j & j & -1 & j & -j & j & j & -j & -j & -j & -j \\ 1 & -j & j & j & -j & j & -1 & j & -j & j & j & -j & -j & -j \\ 1 & -j & -j & j & j & -j & j & -1 & j & -j & j & j & -j & -j \\ 1 & -j & -j & -j & j & j & -j & j & -1 & j & -j & j & j & -j \\ 1 & -j & -j & -j & -j & j & j & -j & j & -1 & j & -j & j & j \\ 1 & j & -j & -j & -j & -j & j & j & -j & j & -1 & j & -j & j \\ 1 & j & j & -j & -j & -j & -j & j & j & -j & j & -1 & j & -j \\ 1 & -j & j & j & -j & -j & -j & -j & j & j & -j & j & -1 & j \\ 1 & j & -j & j & j & -j & -j & -j & -j & j & j & -j & j & -1 \end{bmatrix}$$

11. The method according to claim 1, wherein n is 9, the P matrix is obtained through multiplying at least one column in a P2 matrix by −1, the P2 matrix comprises a 9-order block matrix, elements on a diagonal of the 9-order block matrix are all −1, and a value of any element in the 9-order block matrix except the elements on the diagonal is j or −j.

12. The method according to claim 1, wherein n is 9, and the P2 matrix is:

$$\begin{bmatrix} 1 & 1 & 1 & 1 & 1 & 1 & 1 & 1 & -1 \\ 1 & -1 & -j & -j & -j & -j & j & j & j & j \\ 1 & -j & -1 & j & j & -j & -j & -j & j & j \\ 1 & -j & j & -1 & -j & j & -j & j & -j & j \\ 1 & -j & j & -j & -1 & j & j & -j & j & -j \\ 1 & -j & -j & j & j & -1 & j & j & -j & -j \\ 1 & j & -j & -j & j & j & -1 & -j & -j & j \\ 1 & j & -j & j & -j & j & -j & -1 & j & -j \\ 1 & j & j & -j & j & -j & j & -1 & -j \\ 1 & j & j & j & -j & -j & j & -j & -j & -1 \end{bmatrix}.$$

13. An apparatus, comprising:
at least one memory, configured to store computer instructions; and
at least one processor, configured to execute the computer instructions to cause the apparatus to:
generate a physical layer protocol data unit (PPDU), wherein the PPDU comprises an extremely high throughput-long training field (EHT-LTF), the EHT-LTF is obtained based on a P matrix and a predefined EHT-LTF sequence, the P matrix is an n×n orthogonal matrix, n is an integer greater than 8, and a first row of the P matrix comprises at least one element whose value is 1 and at least one element whose value is −1; and
send the PPDU;
wherein the P matrix is obtained through multiplying at least one column of an n-order P1 matrix by −1, and the P1 matrix comprises a block matrix that is an (n−1)-order Toeplitz matrix.

14. The apparatus according to claim 13, wherein the (n−1)-order Toeplitz matrix satisfies at least one of the following:
a(x,y)=−a(y,x) in the (n−1)-order Toeplitz matrix, wherein a(x,y) is an element in an $x^{th}$ row and a $y^{th}$ column in the (n−1)-order Toeplitz matrix, a(y,x) is an element in a $y^{th}$ row and an $x^{th}$ column in the (n−1)-order Toeplitz matrix, and x≠y; or
the (n−1)-order Toeplitz matrix is a circulant matrix.

15. The apparatus according to claim 13, wherein the P matrix is obtained through multiplying a $(4m+2)^{th}$ column of the n-order P1 matrix by −1, and m is an integer with 0≤m≤(n−2)/4.

16. The apparatus according to claim 13, wherein n is 12, the (n−1)-order Toeplitz matrix is a circulant matrix, and wherein
a first row of the (n−1)-order Toeplitz matrix is one of a vector α=[1, −1, 1, 1, 1, −1, −1, −1, 1, −1, −1], b=[1, 1, −1, 1, −1, −1, 1, −1, −1, −1, 1], a vector obtained after a cyclic shift of α, or a vector obtained after a cyclic shift of b; or
the first row of the (n−1)-order Toeplitz matrix is one of a vector ā=[1, −1, −1, 1, −1, −1, −1, 1, 1, 1, −1]$^T$, a vector b̄=[−1, 1, −1, −1, 1, −1, 1, 1, 1, −1, −1]$^T$, a vector obtained after a cyclic shift of ā, or a vector obtained after a cyclic shift of b̄.

17. The apparatus according to claim 13, wherein n=12, and the n-order P1 matrix is:

$$\begin{bmatrix} 1 & 1 & 1 & 1 & 1 & 1 & 1 & 1 & 1 & 1 & 1 & 1 \\ 1 & 1 & -1 & 1 & 1 & 1 & -1 & -1 & -1 & 1 & -1 & -1 \\ 1 & -1 & 1 & -1 & 1 & 1 & 1 & -1 & -1 & -1 & 1 & -1 \\ 1 & -1 & -1 & 1 & -1 & 1 & 1 & 1 & -1 & -1 & -1 & 1 \\ 1 & 1 & -1 & -1 & 1 & -1 & 1 & 1 & 1 & -1 & -1 & -1 \\ 1 & -1 & 1 & -1 & -1 & 1 & -1 & 1 & 1 & 1 & -1 & -1 \\ 1 & -1 & -1 & 1 & -1 & -1 & 1 & -1 & 1 & 1 & 1 & -1 \\ 1 & -1 & -1 & -1 & 1 & -1 & -1 & 1 & -1 & 1 & 1 & 1 \\ 1 & 1 & -1 & -1 & -1 & 1 & -1 & -1 & 1 & -1 & 1 & 1 \\ 1 & 1 & 1 & -1 & -1 & -1 & 1 & -1 & -1 & 1 & -1 & 1 \\ 1 & 1 & 1 & 1 & -1 & -1 & -1 & 1 & -1 & -1 & 1 & -1 \\ 1 & -1 & 1 & 1 & 1 & -1 & -1 & -1 & 1 & -1 & -1 & 1 \end{bmatrix}, \text{or}$$

$$\begin{bmatrix} 1 & 1 & 1 & 1 & 1 & 1 & 1 & 1 & 1 & 1 & 1 & 1 \\ 1 & 1 & 1 & -1 & 1 & -1 & -1 & 1 & -1 & -1 & -1 & 1 \\ 1 & 1 & 1 & 1 & -1 & 1 & -1 & -1 & 1 & -1 & -1 & -1 \\ 1 & -1 & 1 & 1 & 1 & -1 & 1 & -1 & -1 & 1 & -1 & -1 \\ 1 & -1 & -1 & 1 & 1 & 1 & -1 & 1 & -1 & -1 & 1 & -1 \\ 1 & -1 & -1 & -1 & 1 & 1 & 1 & -1 & 1 & -1 & -1 & 1 \\ 1 & 1 & -1 & -1 & -1 & 1 & 1 & 1 & -1 & 1 & -1 & -1 \\ 1 & -1 & 1 & -1 & -1 & -1 & 1 & 1 & 1 & -1 & 1 & -1 \\ 1 & -1 & -1 & 1 & -1 & -1 & -1 & 1 & 1 & 1 & -1 & 1 \\ 1 & 1 & -1 & -1 & 1 & -1 & -1 & -1 & 1 & 1 & 1 & -1 \\ 1 & -1 & 1 & -1 & -1 & 1 & -1 & -1 & -1 & 1 & 1 & 1 \\ 1 & 1 & -1 & 1 & -1 & -1 & 1 & -1 & -1 & -1 & 1 & 1 \end{bmatrix}.$$

18. The apparatus according to claim 13, wherein n is 12, a(x,y)=−a(y,x) in the (n−1)-order Toeplitz matrix, wherein a(x,y) is the element in the $x^{th}$ row and the $y^{th}$ column in the (n−1)-order Toeplitz matrix, a(y,x) is the element in the $y^{th}$ row and the $x^{th}$ column in the (n−1)-order Toeplitz matrix, and x≠y; and the n-order P1 matrix is:

$$\begin{bmatrix} 1 & 1 & 1 & 1 & 1 & 1 & 1 & 1 & 1 & 1 & 1 & 1 \\ -1 & 1 & -1 & 1 & -1 & -1 & -1 & 1 & 1 & 1 & -1 & 1 \\ -1 & 1 & 1 & -1 & 1 & -1 & -1 & -1 & 1 & 1 & 1 & -1 \\ -1 & -1 & 1 & 1 & -1 & 1 & -1 & -1 & -1 & 1 & 1 & 1 \\ -1 & 1 & -1 & 1 & 1 & -1 & 1 & -1 & -1 & -1 & 1 & 1 \\ -1 & 1 & 1 & -1 & 1 & 1 & -1 & 1 & -1 & -1 & -1 & 1 \\ -1 & 1 & 1 & 1 & -1 & 1 & 1 & -1 & 1 & -1 & -1 & -1 \\ -1 & -1 & 1 & 1 & 1 & -1 & 1 & 1 & -1 & 1 & -1 & -1 \\ -1 & -1 & -1 & 1 & 1 & 1 & -1 & 1 & 1 & -1 & 1 & -1 \\ -1 & -1 & -1 & -1 & 1 & 1 & 1 & -1 & 1 & 1 & -1 & 1 \\ -1 & 1 & -1 & -1 & -1 & 1 & 1 & 1 & -1 & 1 & 1 & -1 \\ -1 & -1 & 1 & -1 & -1 & -1 & 1 & 1 & 1 & -1 & 1 & 1 \end{bmatrix}, \text{ or}$$

$$\begin{bmatrix} 1 & 1 & 1 & 1 & 1 & 1 & 1 & 1 & 1 & 1 & 1 & 1 \\ -1 & 1 & 1 & -1 & 1 & 1 & 1 & -1 & -1 & -1 & 1 & -1 \\ -1 & -1 & 1 & 1 & -1 & 1 & 1 & 1 & -1 & -1 & -1 & 1 \\ -1 & 1 & -1 & 1 & 1 & -1 & 1 & 1 & 1 & -1 & -1 & -1 \\ -1 & -1 & 1 & -1 & 1 & 1 & -1 & 1 & 1 & 1 & -1 & -1 \\ -1 & -1 & -1 & 1 & -1 & 1 & 1 & -1 & 1 & 1 & 1 & -1 \\ -1 & -1 & -1 & -1 & 1 & -1 & 1 & 1 & -1 & 1 & 1 & 1 \\ -1 & 1 & -1 & -1 & -1 & 1 & -1 & 1 & 1 & -1 & 1 & 1 \\ -1 & 1 & 1 & -1 & -1 & -1 & 1 & -1 & 1 & 1 & -1 & 1 \\ -1 & 1 & 1 & 1 & -1 & -1 & -1 & 1 & -1 & 1 & 1 & -1 \\ -1 & -1 & 1 & 1 & 1 & -1 & -1 & -1 & 1 & -1 & 1 & 1 \\ -1 & 1 & -1 & 1 & 1 & 1 & -1 & -1 & -1 & 1 & -1 & 1 \end{bmatrix}.$$

\* \* \* \* \*